(12) United States Patent
Han et al.

(10) Patent No.: US 12,149,990 B2
(45) Date of Patent: Nov. 19, 2024

(54) COMMUNICATION METHOD, PAGING METHOD, DEVICE, AND SYSTEM

(71) Applicant: HUAWEI TECHNOLOGIES CO., LTD., Guangdong (CN)

(72) Inventors: Feng Han, Shanghai (CN); Yinghao Jin, Shanghai (CN); Henrik Olofsson, Kista (SE); Wei Tan, Shanghai (CN); Chong Lou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/117,789

(22) Filed: Dec. 10, 2020

(65) Prior Publication Data

US 2021/0099921 A1   Apr. 1, 2021

Related U.S. Application Data

(63) Continuation of application No. PCT/CN2019/092267, filed on Jun. 21, 2019.

(30) Foreign Application Priority Data

Jun. 22, 2018   (CN) .......................... 201810654319.4

(51) Int. Cl.
*H04W 36/00* (2009.01)
*H04W 28/06* (2009.01)
*H04W 60/00* (2009.01)

(52) U.S. Cl.
CPC ........ *H04W 36/0011* (2013.01); *H04W 28/06* (2013.01); *H04W 36/0055* (2013.01)

(58) Field of Classification Search
CPC ............. H04W 36/00; H04W 36/0011; H04W 36/0055; H04W 28/06
See application file for complete search history.

(56) References Cited

U.S. PATENT DOCUMENTS 9,516,572 B1 * 12/2016 Velusamy ............... H04W 8/08
2014/0066021 A1 * 3/2014 Takahashi ......... H04W 36/0066
455/411

(Continued)

FOREIGN PATENT DOCUMENTS

| CN | 103650437 A | 3/2014 |
| CN | 106341832 A | 1/2017 |

(Continued)

OTHER PUBLICATIONS

LG Electronics Inc., "Considering slice related information during Xn-based handover," 3GPP TSG-RAN WG3 Meeting #NR AdHoc, R3-172565, Qingdao, P. R. China, Jun. 27-29, 2017, 8 pages (Year: 2017).*

(Continued)

*Primary Examiner* — Jinsong Hu
*Assistant Examiner* — Farideh Madani
(74) *Attorney, Agent, or Firm* — Fish & Richardson P.C.

(57) ABSTRACT

This application provides communication methods, devices, and systems for improving communication efficiency. One communication method includes: receiving, by a target access network device and from a source access network device, a handover request message sent by a source access network device, wherein the handover request message is used to for requesting to hand over a terminal device from the source access network device to the target access network device; and obtaining, by the target access network device, network slice selection assistance information supported by the terminal device, wherein the network slice selection assistance information supported by the terminal device is used to indicates a network slice supported by the terminal device.

17 Claims, 16 Drawing Sheets

(56) References Cited

U.S. PATENT DOCUMENTS

| | | | | |
|---|---|---|---|---|
| 2014/0113658 | A1* | 4/2014 | Jin | H04W 64/00 |
| | | | | 455/456.2 |
| 2015/0043382 | A1 | 2/2015 | Arora et al. | |
| 2017/0086118 | A1 | 3/2017 | Vrzic | |
| 2019/0007921 | A1* | 1/2019 | Schliwa-Bertling | |
| | | | | H04W 76/25 |
| 2019/0357129 | A1* | 11/2019 | Park | H04W 88/14 |
| 2019/0357131 | A1* | 11/2019 | Sivavakeesar | H04W 76/19 |
| 2020/0275510 | A1* | 8/2020 | Zhang | H04W 76/11 |
| 2021/0153006 | A1* | 5/2021 | Kim | H04W 8/08 |
| 2021/0337380 | A1* | 10/2021 | Ianev | H04W 60/04 |

FOREIGN PATENT DOCUMENTS

| | | |
|---|---|---|
| CN | 108024297 A | 5/2018 |
| CN | 108029062 A | 5/2018 |
| KR | 20180049796 A | 5/2018 |
| WO | 2018029931 A1 | 2/2018 |
| WO | 2018034924 A1 | 2/2018 |
| WO | 2018082221 A1 | 5/2018 |

OTHER PUBLICATIONS

Extended European Search Report issued in European Application No. 19821931.3 on Aug. 31, 2021, 17 pages.
Huawei, "Clarification on Allowed NSSAI in 38.423," 3GPP TSG-RAN3 Meeting AH-1801, R3-180466, Sophia Antipolis, France, Jan. 22-26, 2018, 3 pages.
Huawei, HiSilicon, "Slice Availability for Cell (Re-)Selection," 3GPP TSG-RAN WG2#97bis, R2-1702591, Spokane, USA, Apr. 3-7, 2017, 3 pages.
Qualcomm Incorporated, "NG-RAN Aware of Allowed NSSAI," 3GPP TSG-RAN3 Meeting #99, R3-181090, Athens, Greece, Feb. 26-Mar. 2, 2018, 5 pages.
Samsung, "Single value of NSSAI in RRC for CCNF(AMF) selection," SA WG2 Meeting #119, S2-171153, Dubrovnik, Croatia, Feb. 13-17, 2017, 3 pages.
EPO Communication pursuant to Rule 164(1) EPC—Partial Supplementary European Search Report issued in European Application No. 19821931.3 on May 14, 2021, 14 pages.
Huawei, "Xn based mobility," 3GPP TSG-RAN3 Meeting AH-1801, R3-180473, Sophia Antipolis, France, Jan. 22-26, 2018, 4 pages.
LG Electronics Inc., "Considering slice related information during Xn-based handover," 3GPP TSG-RAN WG3 Meeting #NR AdHoc, R3-172565, Qingdao, P. R. China, Jun. 27-29, 2017, 8 pages.
3GPP TS 23.501 V15.2.0 (Jun. 2018), "3rd Generation Partnership Project; Technical Specification Group Services and System Aspects; System Architecture for the 5G System; Stage 2(Release 15)," Jun. 2018, 216 pages.
3GPP TS 38.401 V15.1.0 (Mar. 2018), "3rd Generation Partnership Project; Technical Specification Group Radio Access Network; NG-RAN; Architecture description Release 15)," Mar. 2018, 23 pages.
Catt, "Issues on mobility with Slice," 3GPP TSG-RAN WG3 #99, R3-180862, Athens, Greece, Feb. 26-Mar. 2, 2018, 5 pages.
China Telecom, "On Allowed NSSAI in NG-RAN," 3GPP TSG-RAN3 #99bis, R3-181891, Sanya, China, Apr. 16-20, 2018, 3 pages.
Ericsson, "Slice and AMF selection at HO procedure," SA WG2 Meeting #124, S2-178551, Reno, Nevada, USA, Nov. 27-Dec. 1, 2017, 6 pages.
Huawei, "Clarification on Allowed NSSAI in 38.413," 3GPP TSG-RAN3 Meeting AH-1801, R3-180465, Sophia Antipolis, France, Jan. 22-26, 2018, 6 pages.
LG Electronics Inc., "Text proposal on mobility procedure considering network slice," 3GPP TSG-RAN WG3 Meeting #95, R3-170553, Athens, Greece, Feb. 13-17, 2017, 3 pages.
Office Action issued in Chinese Application No. 201810654319.4 on May 9, 2020, 13 pages (with English translation).
Office Action issued in Chinese Application No. 201810654319.4 on Dec. 24, 2020, 8 pages.
PCT International Search Report and Written Opinion issued in International Application No. PCT/CN2019/092267 on Sep. 3, 2019, 15 pages (with English translation).
EP Communication Pursuant to Article 94(3) EPC in European Appln No. 19821931.3, dated Jun. 29, 2023, 8 pages.

* cited by examiner

COMMUNICATION METHOD, PAGING METHOD, DEVICE, AND SYSTEM

CROSS-REFERENCE TO RELATED APPLICATIONS

This application is a continuation of International Application No. PCT/CN2019/092267, filed on Jun. 21, 2019, which claims priority to Chinese Patent Application No. 201810654319.4, filed on Jun. 22, 2018. The disclosures of the aforementioned applications are hereby incorporated by reference in their entireties.

TECHNICAL FIELD

This application relates to the communications field, and in particular, to a communication method, a paging method, a device, and a system.

BACKGROUND

As a key technology in 5G, network slicing has been widely concerned and researched in 3GPP and other international standards organizations, and can meet customization requirements of operators on various industries, vertical industries, and virtual operation services. A network slice may include all resources that can meet a service requirement. For example, the network slice may include a core-network control plane network function and resource, a core-network user plane network function and resource, an air interface for network access, and the like.

However, in a future communications system, there are still many problems that need to be urgently resolved about how to perform related communication and control based on a network slice.

SUMMARY

This application provides a communication method, a paging method, a device, and a system, to improve communication efficiency.

According to a first aspect, a communication method is provided. The communication method includes: A target access network device receives a handover request message sent by a source access network device. The handover request message is used to request to hand over a terminal device from the source access network device to the target access network device. The target access network device obtains network slice selection assistance information supported by the terminal device. The network slice selection assistance information supported by the terminal device is used to indicate a network slice supported by the terminal device.

In this embodiment of this application, in a process in which the terminal device is handed over from the source access network device to the target access network device, the target access network device may obtain the network slice selection assistance information supported by the terminal device, so that the target access network device communicates with the terminal device based on the network slice selection assistance information supported by the terminal device, thereby improving communication efficiency.

In a possible implementation, the method further includes: The target access network device sends a path switch request message to a core network device. The path switch request message is used to request to hand over the terminal device from the source access network device to the target access network device. That the target access network device obtains network slice selection assistance information supported by the terminal device includes: The target access network device receives a path switch request acknowledge message from the core network device. The path switch request acknowledge message includes the network slice selection assistance information supported by the terminal device.

In this embodiment of this application, in the process in which the terminal device is handed over from the source access network device to the target access network device, the target access network device may obtain, from the core network device by using the path switch request message, the network slice selection assistance information supported by the terminal device, so that the target access network device communicates with the terminal device based on the network slice selection assistance information supported by the terminal device, thereby improving the communication efficiency.

In a possible implementation, the method further includes: The target access network device sends a registration request message to a core network device. The registration request message is used to request to update a registration area of the terminal device. That the target access network device obtains network slice selection assistance information supported by the terminal device includes: The target access network device receives a first message from the core network device. The first message includes a registration accept message and the network slice selection assistance information supported by the terminal device, and the registration accept message is used to respond to the registration request message.

In this embodiment of this application, in the process in which the terminal device is handed over from the source access network device to the target access network device, the target access network device may obtain, from the core network device in a registration update process, the network slice selection assistance information supported by the terminal device, so that the target access network device communicates with the terminal device based on the network slice selection assistance information supported by the terminal device, thereby improving the communication efficiency.

In a possible implementation, the method further includes: Before sending the registration request message, the target access network device receives the registration request message from the terminal device. The registration request message is used to request to update the registration area of the terminal device. After receiving the first message, the target access network device sends a second message to the terminal device. The second message includes the registration accept message and the network slice selection assistance information supported by the terminal device. The registration accept message is used to respond to the registration request message.

In this embodiment of this application, in the process in which the terminal device is handed over from the source access network device to the target access network device, the target access network device may send, to the terminal device in the registration update process, the network slice selection assistance information supported by the terminal device, so that the terminal device performs related communication based on the network slice selection assistance information, thereby improving the communication efficiency.

In a possible implementation, the handover request message includes the network slice selection assistance information supported by the terminal device.

In this embodiment of this application, in the process in which the terminal device is handed over from the source access network device to the target access network device, the handover request message sent by the source access network device to the target access network device includes the network slice selection assistance information supported by the terminal device, so that the target access network device communicates with the terminal device based on the network slice selection assistance information, thereby improving the communication efficiency.

In a possible implementation, the handover request message further includes registration area information of the terminal device, and the registration area information is used to indicate a tracking area corresponding to the terminal device.

In this embodiment of this application, in the process in which the terminal device is handed over from the source access network device to the target access network device, the handover request message sent by the source access network device to the target access network device includes the registration area information of the terminal device, so that the target access network device determines, based on the registration area information, whether the network slice selection assistance information, supported by the terminal device, in the handover request message is valid, thereby improving the communication efficiency.

According to a second aspect, a communication method is provided. The communication method includes: A core network device receives a path switch request message from a target access network device. The path switch request message is used to request to hand over a terminal device from a source access network device to the target access network device. The core network device sends a path switch request acknowledge message to the target access network device. The path switch request acknowledge message includes network slice selection assistance information supported by the terminal device, and the network slice selection assistance information supported by the terminal device is used to indicate a network slice supported by the terminal device.

In this embodiment of this application, in a process in which the terminal device is handed over from the source access network device to the target access network device, the core network device may send, to the access network device by using the path switch request message, the network slice selection assistance information supported by the terminal device, so that the target access network device communicates with the terminal device based on the network slice selection assistance information supported by the terminal device, thereby improving communication efficiency.

According to a third aspect, a communication method is provided. The communication method includes: A core network device receives a registration request message from a target access network device. The registration request message is used to request to update a registration area of a terminal device. The core network device sends a first message to the target access network device. The first message includes a registration accept message and network slice selection assistance information supported by the terminal device, and the registration accept message is used to respond to the registration request message.

In this embodiment of this application, in a process in which the terminal device is handed over from a source access network device to the target access network device, the core network device may send, to the target access network device in a registration update process, the network slice selection assistance information supported by the terminal device, so that the target access network device communicates with the terminal device based on the network slice selection assistance information, thereby improving communication efficiency.

According to a fourth aspect, a communication method is provided. The communication method includes: A terminal device sends a registration request message to an access network device. The registration request message is used to request to update a registration area of the terminal device. The terminal device receives a second message from the access network device. The second message includes a registration accept message and network slice selection assistance information supported by the terminal device, and the registration accept message is used to respond to the registration request message.

In this embodiment of this application, in a process in which the terminal device is handed over from a source access network device to a target access network device, the terminal device may receive, from the target access network device in a registration update process, the network slice selection assistance information supported by the terminal device, so that the terminal device performs related communication based on the network slice selection assistance information, thereby improving communication efficiency.

According to a fifth aspect, a communication method is provided. The communication method includes: A source access network device generates a handover request message. The handover request message is used to request to hand over a terminal device from the source access network device to a target access network device, and includes network slice selection assistance information supported by the terminal device, and the network slice selection assistance information supported by the terminal device is used to indicate a network slice supported by the terminal device. The source access network device sends the handover request message to the target access network device.

In this embodiment of this application, in a process in which the terminal device is handed over from the source access network device to the target access network device, the handover request message sent by the source access network device to the target access network device includes the network slice selection assistance information supported by the terminal device, so that the target access network device communicates with the terminal device based on the network slice selection assistance information, thereby improving communication efficiency.

In a possible implementation, the handover request message further includes registration area information of the terminal device, and the registration area information is used to indicate a tracking area corresponding to the terminal device.

In this embodiment of this application, in the process in which the terminal device is handed over from the source access network device to the target access network device, the handover request message sent by the source access network device to the target access network device includes the registration area information of the terminal device, so that the target access network device determines, based on the registration area information, whether the network slice selection assistance information, supported by the terminal device, in the handover request message is valid, thereby improving the communication efficiency.

According to a sixth aspect, a paging method is provided. The paging method includes: An access network device receives a first paging message. The first paging message includes first information, and the first information includes at least one of the following: information about a network slice, a quality of service flow identifier (QoS flow ID, QFI), a 5th generation mobile communications technology quality of service identifier (5G QoS ID, 5QI) 5QI, an allocation and retention priority (ARP), and a data network name (DNN). The access network device sends a second paging message to a terminal device after receiving the first paging message.

In this embodiment of this application, the paging message received by the access network device may include the first information, and the first information may include the information about the network slice, the QFI, the 5QI, the ARP, or the DNN. The access network device may perform related control or communication based on the first information, to improve communication efficiency.

In a possible implementation, the second paging message includes the first information.

In a possible implementation, the terminal device is in an idle state, and that an access network device receives a first paging message includes: The access network device receives the first paging message from a core network device.

In this embodiment of this application, when the terminal device is in the idle state, the first paging message received by the access network device from the core network device may include the first information, and the first information may include the information about the network slice, the QFI, the 5QI, the ARP, or the DNN. The access network device may perform related control or communication based on the first information, to improve the communication efficiency.

In a possible implementation, the terminal device is in an inactive state, and the access network device is a first access network device. That an access network device receives a first paging message includes: The first access network device receives the first paging message from a second access network device. The first access network device is an access network device on which the terminal device currently camps, and the second access network device is an access network device on which the terminal device camped last time.

In this embodiment of this application, when the terminal device is in the inactive state, the first paging message received, by the first access network device on which the terminal device currently camps, from the second access network device on which the terminal device camped last time may include the first information, and the first information may include the information about the network slice, the QFI, the 5QI, the ARP, or the DNN. The access network device may perform related control or communication based on the first information, to improve the communication efficiency.

According to a seventh aspect, a paging method is provided. The paging method includes: A core network device generates a first paging message. The first paging message includes first information, and the first information includes at least one of the following: information about a network slice, a QFI, a 5QI, and a DNN. The core network device sends the first paging message to an access network device.

In this embodiment of this application, the first paging message sent by the core network device to the access network device may include the first information, and the first information may include the information about the network slice, the QFI, the 5QI, the ARP, or the DNN. The access network device may perform related control or communication based on the first information, to improve communication efficiency.

According to an eighth aspect, a paging method is provided. The paging method includes: A second access network device generates a first paging message. The first paging message corresponds to a terminal device, and includes first information, and the first information includes at least one of the following: information about a network slice, a QFI, a 5QI, an ARP, and a DNN. The second access network device sends the first paging message to a first access network device. The first access network device is an access network device on which the terminal device currently camps, and the second access network device is an access network device on which the terminal device camped last time.

In this embodiment of this application, the first paging message sent, by the second access network device on which the terminal device camped last time, to the first access network device on which the terminal device currently camps may include the first information, and the first information may include the information about the network slice, the QFI, the 5QI, the ARP, or the DNN. The access network device may perform related control or communication based on the first information, to improve communication efficiency.

According to a ninth aspect, a communication method is provided. The communication method includes: A first access network device sends, to a second access network device, a request message for obtaining a context of a terminal device. The request message for obtaining the context of the terminal device is used to request the context of the terminal device. The first access network device is an access network device on which the terminal device currently camps, and the second access network device is an access network device on which the terminal device camped last time. The first access network device receives, from the second access network device, a response message for obtaining the context of the terminal device. The response message for obtaining the context of the terminal device includes network slice selection assistance information supported by the terminal device, and the network slice selection assistance information is used to indicate a network slice supported by the terminal device.

In this embodiment of this application, in a process in which the terminal device is switched from an inactive state to a connected state, the first access network device on which the terminal device currently camps receives, from the second access network device on which the terminal device camped last time, the response message for obtaining the context of the terminal device, and the response message for obtaining the context of the terminal device includes the network slice selection assistance information supported by the terminal device, so that the first access network device communicates with the terminal device based on the network slice selection assistance information, thereby improving communication efficiency.

In a possible implementation, the terminal device is in the inactive state.

In a possible implementation, the method further includes: The first access network device receives registration area information of the terminal device from the second access network device. The registration area information is used to indicate a tracking area corresponding to the terminal device.

In this embodiment of this application, in the process in which the terminal device is switched from the inactive state to the connected state, the first access network device on which the terminal device currently camps obtains the registration area information of the terminal device from the second access network device on which the terminal device camped last time, so that the first access network device determines, based on the registration area information, whether the network slice selection assistance information, supported by the terminal device, sent by the second access network device is valid, thereby improving the communication efficiency.

According to a tenth aspect, a communication method is provided. The communication method includes: A second access network device receives, from a first access network device, a request message for obtaining a context of a terminal device. The request message for obtaining the context of the terminal device is used to request the context of the terminal device. The first access network device is an access network device on which the terminal device currently camps, and the second access network device is an access network device on which the terminal device camped last time. The second access network device sends, to the first access network device, a response message for obtaining the context of the terminal device. The response message for obtaining the context of the terminal device includes network slice selection assistance information supported by the terminal device, and the network slice selection assistance information is used to indicate a network slice supported by the terminal device.

In this embodiment of this application, in a process in which the terminal device is switched from an inactive state to a connected state, the second access network device on which the terminal device camped last time sends, to the first access network device on which the terminal device currently camps, a terminal device context response message. The response message for obtaining the context of the terminal device includes the network slice selection assistance information supported by the terminal device, so that the first access network device communicates with the terminal device based on the network slice selection assistance information, thereby improving communication efficiency.

In a possible implementation, the terminal device is in the inactive state.

In a possible implementation, the method further includes: The second access network device sends registration area information of the terminal device to the first access network device. The registration area information is used to indicate a tracking area corresponding to the terminal device.

In this embodiment of this application, in the process in which the terminal device is switched from the inactive state to the connected state, the second access network device on which the terminal device camped last time sends the registration area information of the terminal device to the first access network device on which the terminal device currently camps, so that the first access network device determines, based on the registration area information, whether the network slice selection assistance information, supported by the terminal device, sent by the second access network device is valid, thereby improving the communication efficiency.

According to an eleventh aspect, a communication method is provided. The communication method includes: An access network device receives a third message from a terminal device. The third message includes a service request message, and the service request message is used to request to switch the terminal device from an idle state to a connected state. The third message further includes at least one of the following: network slice selection assistance information supported by the terminal device and single network slice selection assistance information. The access network device sends a fourth message to a core network device. The fourth message includes the service request message.

In this embodiment of this application, in a process in which the terminal device is switched from the idle state to the connected state, the access network device receives the third message sent by the terminal device; and the third message includes the service request message, and further includes the network slice selection assistance information supported by the terminal device and/or the single network slice selection assistance information (S-NSSAI) triggering the service request message, so that the access network device obtains, based on the third message, the network slice selection assistance information supported by the terminal device and/or the single network slice selection assistance information, to perform related control or communication.

In a possible implementation, the third message is a radio resource control (RRC) setup request message or an RRC setup complete message.

According to a twelfth aspect, a communication method is provided. The communication method includes: A terminal device generates a third message. The third message includes a service request message, and the service request message is used to request to switch the terminal device from an idle state to a connected state. The third message further includes at least one of the following: network slice selection assistance information supported by the terminal device and single network slice selection assistance information. The terminal device sends the third message to an access network device.

In a possible implementation, the third message is an RRC setup request message or an RRC setup complete message.

According to a thirteenth aspect, an access network device is provided. The access network device has functions of implementing behavior of the access network device in the foregoing method embodiments. The functions may be implemented by hardware, or may be implemented by hardware executing corresponding software. The hardware or the software includes one or more units corresponding to the foregoing functions. The access network device may include, for example, the foregoing access network device, target access network device, source access network device, first access network device, or second access network device.

According to a fourteenth aspect, a core network device is provided. The core network device has functions of implementing behavior of the core network device in the foregoing method embodiments. The functions may be implemented by hardware, or may be implemented by hardware executing corresponding software. The hardware or the software includes one or more units corresponding to the foregoing functions.

According to a fifteenth aspect, a terminal device is provided. The terminal device has functions of implementing behavior of the terminal device in the foregoing method embodiments. The functions may be implemented by hardware, or may be implemented by hardware executing corresponding software. The hardware or the software includes one or more units corresponding to the foregoing functions.

According to a sixteenth aspect, a communications system is provided. The communications system includes the access network device according to the thirteenth aspect and the core network device according to the fourteenth aspect;

or the communications system includes the access network device according to the thirteenth aspect, the core network device according to the fourteenth aspect, and the terminal device according to the fifteenth aspect.

According to a seventeenth aspect, a communications apparatus is provided. The communications apparatus may be the access network device in the foregoing method embodiments, or may be a chip disposed in the access network device. The communications apparatus includes a memory configured to store computer-executable program code, a communications interface, and a processor. The processor is coupled to the memory and the communications interface. The program code stored in the memory includes an instruction, and when the processor executes the instruction, the communications apparatus is enabled to perform the methods performed by the access network device in the foregoing method embodiments. The access network device may include, for example, the foregoing access network device, target access network device, source access network device, first access network device, or second access network device.

According to an eighteenth aspect, a communications apparatus is provided. The communications apparatus may be the core network device in the foregoing method embodiments, or may be a chip disposed in the core network device. The communications apparatus includes a memory configured to store computer-executable program code, a communications interface, and a processor. The processor is coupled to the memory and the communications interface. The program code stored in the memory includes an instruction, and when the processor executes the instruction, the communications apparatus is enabled to perform the methods performed by the core network device in the foregoing method embodiments.

According to a nineteenth aspect, a communications apparatus is provided. The communications apparatus may be the terminal device in the foregoing method embodiments, or may be a chip disposed in the terminal device. The communications apparatus includes a memory configured to store computer-executable program code, a communications interface, and a processor. The processor is coupled to the memory and the communications interface. The program code stored in the memory includes an instruction, and when the processor executes the instruction, the communications apparatus is enabled to perform the methods performed by the terminal device in the foregoing method embodiments.

According to a twentieth aspect, a communications system is provided. The communications system includes the communications apparatus according to the seventeenth aspect and the communications apparatus according to the eighteenth aspect; or the communications system includes the communications apparatus according to the seventeenth aspect, the communications apparatus according to the eighteenth aspect, and the communications apparatus according to the nineteenth aspect.

According to a twenty-first aspect, a computer program product is provided. The computer program product includes computer program code, and when the computer program code is run on a computer, the computer is enabled to perform the method according to any one of the foregoing aspects.

According to a twenty-second aspect, a computer-readable medium is provided. The computer-readable medium stores program code, and when the computer program code is run on a computer, the computer is enabled to perform the method according to any one of the foregoing aspects.

According to a twenty-third aspect, this application provides a chip system. The chip system includes a processor, used by an access network device to implement functions in the foregoing aspects, for example, receive or process data and/or information in the foregoing methods. In a possible design, the chip system further includes a memory, and the memory is configured to store a program instruction and data that are necessary for the access network device. The chip system may include a chip, or may include a chip and another discrete component. The access network device may include, for example, the foregoing access network device, target access network device, source access network device, first access network device, or second access network device.

According to a twenty-fourth aspect, this application provides a chip system. The chip system includes a processor, used by a core network device to implement functions in the foregoing aspects, for example, receive or process data and/or information in the foregoing methods. In a possible design, the chip system further includes a memory, and the memory is configured to store a program instruction and data that are necessary for the core network device. The chip system may include a chip, or may include a chip and another discrete component.

According to a twenty-fifth aspect, this application provides a chip system. The chip system includes a processor, used by a terminal device to implement functions in the foregoing aspects, for example, receive or process data and/or information in the foregoing methods. In a possible design, the chip system further includes a memory, and the memory is configured to store a program instruction and data that are necessary for a core network device. The chip system may include a chip, or may include a chip and another discrete component.

According to a twenty-sixth aspect, an access network device is provided. The access network device is a target access network device, and includes: a communications unit, configured to receive a handover request message sent by a source access network device, where the handover request message is used to request to hand over a terminal device from the source access network device to the target access network device; and a processing unit, configured to obtain network slice selection assistance information supported by the terminal device, where the network slice selection assistance information supported by the terminal device is used to indicate a network slice supported by the terminal device.

In this embodiment of this application, in a process in which the terminal device is handed over from the source access network device to the target access network device, the target access network device may obtain the network slice selection assistance information supported by the terminal device, so that the target access network device communicates with the terminal device based on the network slice selection assistance information supported by the terminal device, thereby improving communication efficiency.

In a possible implementation, the communications unit is further configured to send a path switch request message to a core network device. The path switch request message is used to request to hand over the terminal device from the source access network device to the target access network device. In terms of the obtaining network slice selection assistance information supported by the terminal device, the processing unit is configured to receive a path switch request acknowledge message from the core network device through the communications unit. The path switch request acknowledge message includes the network slice selection assistance information supported by the terminal device.

In this embodiment of this application, in the process in which the terminal device is handed over from the source access network device to the target access network device, the target access network device may obtain, from the core network device by using the path switch request message, the network slice selection assistance information supported by the terminal device, so that the target access network device communicates with the terminal device based on the network slice selection assistance information supported by the terminal device, thereby improving the communication efficiency.

In a possible implementation, the communications unit is further configured to send a registration request message to a core network device. The registration request message is used to request to update a registration area of the terminal device. In terms of the obtaining network slice selection assistance information supported by the terminal device, the processing unit is configured to receive a first message from the core network device through the communications unit. The first message includes a registration accept message and the network slice selection assistance information supported by the terminal device, and the registration accept message is used to respond to the registration request message.

In this embodiment of this application, in the process in which the terminal device is handed over from the source access network device to the target access network device, the target access network device may obtain, from the core network device in a registration update process, the network slice selection assistance information supported by the terminal device, so that the target access network device communicates with the terminal device based on the network slice selection assistance information supported by the terminal device, thereby improving the communication efficiency.

In a possible implementation, the communications unit is configured to: before sending the registration request message, receive the registration request message from the terminal device. The registration request message is used to request to update the registration area of the terminal device. The communications unit is further configured to: after receiving the first message, send a second message to the terminal device. The second message includes the registration accept message and the network slice selection assistance information supported by the terminal device. The registration accept message is used to respond to the registration request message.

In this embodiment of this application, in the process in which the terminal device is handed over from the source access network device to the target access network device, the target access network device may send, to the terminal device in the registration update process, the network slice selection assistance information supported by the terminal device, so that the terminal device performs related communication based on the network slice selection assistance information, thereby improving the communication efficiency.

In a possible implementation, the handover request message includes the network slice selection assistance information supported by the terminal device.

In this embodiment of this application, in the process in which the terminal device is handed over from the source access network device to the target access network device, the handover request message sent by the source access network device to the target access network device includes the network slice selection assistance information supported by the terminal device, so that the target access network device communicates with the terminal device based on the network slice selection assistance information, thereby improving the communication efficiency.

In a possible implementation, the handover request message further includes registration area information of the terminal device, and the registration area information is used to indicate a tracking area corresponding to the terminal device.

In this embodiment of this application, in the process in which the terminal device is handed over from the source access network device to the target access network device, the handover request message sent by the source access network device to the target access network device includes the registration area information of the terminal device, so that the target access network device determines, based on the registration area information, whether the network slice selection assistance information, supported by the terminal device, in the handover request message is valid, thereby improving the communication efficiency.

According to a twenty-seventh aspect, a core network device is provided. The core network device includes: a receiving unit, configured to receive a path switch request message from a target access network device, where the path switch request message is used to request to hand over a terminal device from a source access network device to the target access network device; and a sending unit, configured to send a path switch request acknowledge message to the target access network device, where the path switch request acknowledge message includes network slice selection assistance information supported by the terminal device, and the network slice selection assistance information supported by the terminal device is used to indicate a network slice supported by the terminal device.

In this embodiment of this application, in a process in which the terminal device is handed over from the source access network device to the target access network device, the core network device may send, to the access network device by using the path switch request message, the network slice selection assistance information supported by the terminal device, so that the target access network device communicates with the terminal device based on the network slice selection assistance information supported by the terminal device, thereby improving communication efficiency.

According to a twenty-eighth aspect, a core network device is provided. The core network device includes: a receiving unit, configured to receive a registration request message from a target access network device, where the registration request message is used to request to update a registration area of a terminal device; and a sending unit, configured to send a first message to the target access network device, where the first message includes a registration accept message and network slice selection assistance information supported by the terminal device, and the registration accept message is used to respond to the registration request message.

In this embodiment of this application, in a process in which the terminal device is handed over from a source access network device to the target access network device, the core network device may send, to the target access network device in a registration update process, the network slice selection assistance information supported by the terminal device, so that the target access network device communicates with the terminal device based on the network slice selection assistance information, thereby improving communication efficiency.

According to a twenty-ninth aspect, a terminal device is provided. The terminal device includes: a sending unit, configured to send a registration request message to an access network device, where the registration request message is used to request to update a registration area of the terminal device; and a receiving unit, configured to receive a second message from the access network device, where the second message includes a registration accept message and network slice selection assistance information supported by the terminal device, and the registration accept message is used to respond to the registration request message.

In this embodiment of this application, in a process in which the terminal device is handed over from a source access network device to a target access network device, the terminal device may receive, from the target access network device in a registration update process, the network slice selection assistance information supported by the terminal device, so that the terminal device performs related communication based on the network slice selection assistance information, thereby improving communication efficiency.

According to a thirtieth aspect, an access network device is provided. The access network device is a source access network device, and includes: a processing unit, configured to generate a handover request message, where the handover request message is used to request to hand over a terminal device from the source access network device to a target access network device, and includes network slice selection assistance information supported by the terminal device; and the network slice selection assistance information supported by the terminal device is used to indicate a network slice supported by the terminal device; and a communications unit, configured to send the handover request message to the target access network device.

In this embodiment of this application, in a process in which the terminal device is handed over from the source access network device to the target access network device, the handover request message sent by the source access network device to the target access network device includes the network slice selection assistance information supported by the terminal device, so that the target access network device communicates with the terminal device based on the network slice selection assistance information, thereby improving communication efficiency.

In a possible implementation, the handover request message further includes registration area information of the terminal device, and the registration area information is used to indicate a tracking area corresponding to the terminal device.

In this embodiment of this application, in the process in which the terminal device is handed over from the source access network device to the target access network device, the handover request message sent by the source access network device to the target access network device includes the registration area information of the terminal device, so that the target access network device determines, based on the registration area information, whether the network slice selection assistance information, supported by the terminal device, in the handover request message is valid, thereby improving the communication efficiency.

According to a thirty-first aspect, an access network device is provided. The access network device includes: a receiving unit, configured to receive a first paging message, where the first paging message includes first information, and the first information includes at least one of the following: information about a network slice, a quality of service flow identifier (QoS flow ID, QFI), a 5th generation mobile communications technology quality of service identifier (5G QoS ID, 5QI) 5QI, an allocation and retention priority (ARP), and a data network name (DNN); and a sending unit, configured to send a second paging message to a terminal device after the first paging message is received.

In this embodiment of this application, the paging message received by the access network device may include the first information, and the first information may include the information about the network slice, the QFI, the 5QI, the ARP, or the DNN. The access network device may perform related control or communication based on the first information, to improve communication efficiency.

In a possible implementation, the second paging message includes the first information.

In a possible implementation, the terminal device is in an idle state, and in terms of the receiving a first paging message, the communications unit is configured to receive the first paging message from a core network device.

In this embodiment of this application, when the terminal device is in the idle state, the first paging message received by the access network device from the core network device may include the first information, and the first information may include the information about the network slice, the QFI, the 5QI, the ARP, or the DNN. The access network device may perform related control or communication based on the first information, to improve the communication efficiency.

In a possible implementation, the terminal device is in an inactive state, and the access network device is a first access network device. In terms of the receiving a first paging message, the communications unit is configured to receive the first paging message from a second access network device. The first access network device is an access network device on which the terminal device currently camps, and the second access network device is an access network device on which the terminal device camped last time.

In this embodiment of this application, when the terminal device is in the inactive state, the first paging message received, by the first access network device on which the terminal device currently camps, from the second access network device on which the terminal device camped last time may include the first information, and the first information may include the information about the network slice, the QFI, the 5QI, the ARP, or the DNN. The access network device may perform related control or communication based on the first information, to improve the communication efficiency.

According to a thirty-second aspect, a core network device is provided. The core network device includes, a processing unit, configured to generate a first paging message, where the first paging message includes first information, and the first information includes at least one of the following: information about a network slice, a QFI, a 5QI, and a DNN; and a communications unit, configured to send the first paging message to an access network device.

In this embodiment of this application, the first paging message sent by the core network device to the access network device may include the first information, and the first information may include the information about the network slice, the QFI, the 5QI, the ARP, or the DNN. The access network device may perform related control or communication based on the first information, to improve communication efficiency.

According to a thirty-third aspect, an access network device is provided. The access network device includes: a processing unit, configured to generate a first paging message, where the first paging message corresponds to a terminal device, and includes first information, and the first information includes at least one of the following: information about a network slice, a QFI, a 5QI, an ARP, and a DNN; and a communications unit, configured to send the first paging message. The first access network device is an access network device on which the terminal device currently camps, and the second access network device is an access network device on which the terminal device camped last time.

In this embodiment of this application, the first paging message sent, by the second access network device on which the terminal device camped last time, to the first access network device on which the terminal device currently camps may include the first information, and the first information may include the information about the network slice, the QFI, the 5QI, the ARP, or the DNN. The access network device may perform related control or communication based on the first information, to improve communication efficiency.

According to a thirty-fourth aspect, an access network device is provided. The access network device is a target access network device, and includes:

a communications interface, a memory configured to store an instruction, and a processor separately connected to the memory and the communications interface and configured to execute the instruction stored in the memory, to perform the following steps when the instruction is executed: receiving, through the communications interface, a handover request message sent by a source access network device, where the handover request message is used to request to hand over a terminal device from the source access network device to the target access network device; and obtaining network slice selection assistance information supported by the terminal device, where the network slice selection assistance information supported by the terminal device is used to indicate a network slice supported by the terminal device.

In a possible implementation, the processor is further configured to send a path switch request message to a core network device through the communications interface. The path switch request message is used to request to hand over the terminal device from the source access network device to the target access network device. In terms of the obtaining network slice selection assistance information supported by the terminal device, the processor is configured to receive a path switch request acknowledge message from the core network device through the communications interface. The path switch request acknowledge message includes the network slice selection assistance information supported by the terminal device.

In a possible implementation, the processor is further configured to send a registration request message to a core network device through the communications interface. The registration request message is used to request to update a registration area of the terminal device. In terms of the obtaining network slice selection assistance information supported by the terminal device, the processor is configured to receive a first message from the core network device through the communications interface. The first message includes a registration accept message and the network slice selection assistance information supported by the terminal device, and the registration accept message is used to respond to the registration request message.

In a possible implementation, the processor is further configured to: before sending the registration request message, receive the registration request message from the terminal device through the communications interface; and after receiving the first message, send a second message to the terminal device through the communications interface. The second message includes the registration accept message and the network slice selection assistance information supported by the terminal device.

In a possible implementation, the handover request message includes the network slice selection assistance information supported by the terminal device.

In a possible implementation, the handover request message further includes registration area information of the terminal device, and the registration area information is used to indicate a tracking area corresponding to the terminal device.

According to a thirty-fifth aspect, a core network device is provided. The core network device includes: a communications interface, a memory configured to store an instruction, and a processor separately connected to the memory and the communications interface and configured to execute the instruction stored in the memory, to perform the following steps when the instruction is executed: receiving a path switch request message from a target access network device through the communications interface, where the path switch request message is used to request to hand over a terminal device from a source access network device to the target access network device; and sending a path switch request acknowledge message to the target access network device through the communications interface, where the path switch request acknowledge message includes network slice selection assistance information supported by the terminal device, and the network slice selection assistance information supported by the terminal device is used to indicate a network slice supported by the terminal device.

According to a thirty-sixth aspect, a core network device is provided. The core network device includes: a communications interface, a memory configured to store an instruction, and a processor separately connected to the memory and the communications interface and configured to execute the instruction stored in the memory, to perform the following steps when the instruction is executed: receiving a registration request message from a target access network device through the communications interface, where the registration request message is used to request to update a registration area of a terminal device; and sending a first message to the target access network device through the communications interface, where the first message includes a registration accept message and network slice selection assistance information supported by the terminal device, and the registration accept message is used to respond to the registration request message.

According to a thirty-seventh aspect, a terminal device is provided. The terminal device includes: a communications interface, a memory configured to store an instruction, and a processor separately connected to the memory and the communications interface and configured to execute the instruction stored in the memory, to perform the following steps when the instruction is executed: sending a registration request message to an access network device through the communications interface, where the registration request message is used to request to update a registration area of the terminal device; and receiving a second message from the access network device through the communications interface, where the second message includes a registration accept message and network slice selection assistance information supported by the terminal device, and the registration accept message is used to respond to the registration request message.

According to a thirty-eighth aspect, an access network device is provided. The access network device includes: a communications interface, a memory configured to store an instruction, and a processor separately connected to the memory and the communications interface and configured to execute the instruction stored in the memory, to perform the following steps when the instruction is executed: receiving a first paging message through the communications interface, where the first paging message includes first information, and the first information includes at least one of the following: information about a network slice, a quality of service flow identifier (QoS flow ID, QFI), a 5th generation mobile communications technology quality of service identifier (5G QoS ID, 5QI) 5QI, an allocation and retention priority (ARP), and a data network name (DNN); and sending a second paging message to a terminal device through the communications interface after receiving the first paging message.

In a possible implementation, the second paging message includes the first information.

In a possible implementation, the terminal device is in an idle state, and in terms of the receiving a first paging message, the processor is configured to receive the first paging message from a core network device through the communications interface.

In a possible implementation, the terminal device is in an inactive state, and the access network device is a first access network device. In terms of the receiving a first paging message, the communications unit is configured to receive the first paging message from a second access network device. The first access network device is an access network device on which the terminal device currently camps, and the second access network device is an access network device on which the terminal device camped last time.

According to a thirty-ninth aspect, a core network device is provided. The core network device includes: a communications interface, a memory configured to store an instruction, and a processor separately connected to the memory and the communications interface and configured to execute the instruction stored in the memory, to perform the following steps when the instruction is executed: generating a first paging message, where the first paging message includes first information, and the first information includes at least one of the following: information about a network slice, a QFI, a 5QI, and a DNN; and sending the first paging message to an access network device through the communications interface.

According to a fortieth aspect, an access network device is provided. The access network device includes: a communications interface, a memory configured to store an instruction, and a processor separately connected to the memory and the communications interface and configured to execute the instruction stored in the memory, to perform the following steps ben the instruction is executed: generating a first paging message, where the first paging message corresponds to a terminal device, and includes first information, and the first information includes at least one of the following: information about a network slice, a QFI, a 5QI, an ARP, and a DNN; and sending the first paging message through the communications interface. The first access network device is an access network device on which the terminal device currently camps, and the second access network device is an access network device on which the terminal device camped last time.

DESCRIPTION OF EMBODIMENTS

Figure 1:
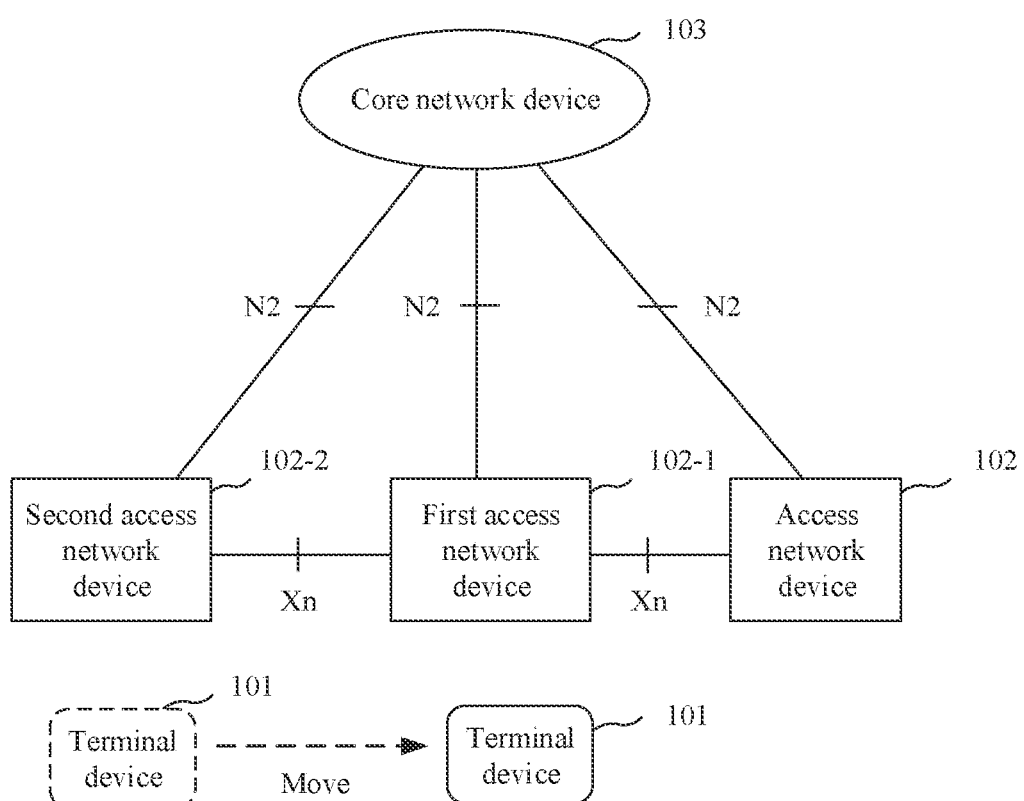
FIG. 1 is a schematic diagram of an application environment according to an embodiment of this application.

The following describes the technical solutions of this application with reference to the accompanying drawings.

The technical solutions of the embodiments of this application may be applied to various communications systems, such as a global system for mobile communications (GSM)

system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5th generation (5G) system or a new radio (NR) system.

A terminal device in the embodiments of this application may be user equipment, an access terminal, a subscriber unit, a subscriber station, a mobile station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

An access network device in the embodiments of this application may be a device configured to communicate with the terminal device. The access network device may be a base transceiver station (BTS) in the global system for mobile communications (global system for mobile communications, GSM) system or the code division multiple access (CDMA) system, may be a NodeB (NB) in the wideband code division multiple access (WCDMA) system, may be an evolved NodeB (eNB or eNodeB) in the LTE system or may be a radio controller in a cloud radio access network (CRAN) scenario. Alternatively, the access network device may be a relay station, an access point, a vehicle-mounted device, a wearable device, a gNB (gNB) in the future 5G network, a base station in the future evolved PLMN network, or the like, or may be an access node (AN), for example, a 5G-AN. Alternatively, the access network device may include a centralized unit (CU) and a distributed unit (DU). The access network device may be a CU or a DU. This is not limited in the embodiments of this application.

In the embodiments of this application, a core network device may include, for example, a user plane function (UPF) entity, an access and mobility management function (AMF), and a session management function (SMF).

In the embodiments of this application, the terminal device, the access network device, or the core network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems, for example, a Linux operating system, a Unix operating system, an Android operating system, an iOS operating system, or a Windows operating system, that implement service processing through a process. The application layer includes applications such as a browser, an address book, word processing software, and instant communications software. In addition, a specific structure of an execution body of a method provided in the embodiments of this application is not specifically limited in the embodiments of this application provided that a program that records code for the method provided in the embodiments of this application can be run to perform communication according to the method provided in the embodiments of this application. For example, the execution body of the method provided in the embodiments of this application may be a terminal device, a network device, or a function module that can invoke and execute the program in a terminal device or a network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel and various other media that can store, contain, and/or carry an instruction and/or data.

For ease of understanding, several terms in the embodiments of this application are described first.

Network slice selection assistance information (NSSAI): The NSSAI may be a value defined in a standard, or may be a value privately defined in a PLMN. One piece of NSSAI may include one or more pieces of S-NSSAI. Each piece of S-NSSAI corresponds to one specific network slice.

Requested NSSAI of the terminal device: NSSAI carried by the terminal device in a registration process. A radio access network (RAN) may select an access and mobility management function (AMF) by using the NSSAI, for example, when the terminal device initially accesses the network or performs registration area update (tracking area update, TAU).

Single network slice selection assistance information (S-NSSAI): The S-NSSAI corresponds to one specific network slice. The S-NSSAI may include a slice/service type (SST). Alternatively, the S-NSSAI may further include a network slice differentiator (SD).

The SST indicates a feature and a service that are expected to be provided by the network. The SD may be used as supplementary information for the SST during selection of a network slice instance (NS). For example, when the SST indicates a plurality of NSIs, the SD may be further used to differentiate between the NSIs.

NSSAI supported by the terminal device: The NSSAI supported by the terminal device may also be referred to as allowed NSSAI or allowed S-NSSAI. The NSSAI supported by the terminal device is one or more pieces of S-NSSAI available to the terminal device in a current registration area. The NSSAI supported by the terminal device may be all S-NSSAI supported by the terminal device. The terminal device may obtain, from the core network device in the registration process, the NSSAI supported by the terminal device.

QoS flow: A data packet processing mechanism on an air interface is defined in 5G based on a data resource bearer (DRB). Data packets served by one DRB have a same packet processing mechanism during transmission on the air interface. A plurality of DRBs may be set up between a base station and the terminal device to meet QoS flows with different packet processing requirements. It should be noted that a same DRB may have a mapping relationship with one QoS flow, or may have a mapping relationship with a plurality of QoS flows. Specifically, for downlink data transmission (down load, DL), the base station may map, to a corresponding DRB based on a QFI identifier and a QoS rule (profile) corresponding to the QFI, a downlink data packet corresponding to a QoS flow, and perform downlink transmission. Correspondingly, for uplink data transmission (up load, UL), the terminal device maps, to a corresponding DRB based on a mapping relationship that is configured by the base station and that is between a QoS flow and a DRB, an uplink data packet corresponding to a QoS flow, and performs uplink transmission.

Parameter of a QoS flow: The parameter of the QoS flow may also be referred to as a configuration parameter of the QoS flow. Specifically, each QoS flow includes at least the following parameters: a 5G QoS identifier (5QI) and an allocation and retention priority (ARP) parameter.

5G QoS identifier (5QI): a QoS identifier in 5G.

Inactive state: In the state, both the terminal device and an access network device on which the terminal device camped last time store access stratum context information of the terminal device, and the access network device on which the terminal device camped last time and a core network retain an NG interface-based connection related to the terminal device. When the terminal device moves in an area configured by the access network device on which the terminal device camped last time, the access network device on which the terminal device camped does not need to be notified. When the terminal device leaves the camping area, an area update request is triggered.

FIG. 1 is a schematic diagram of an application environment according to an embodiment of this application. As shown in FIG. 1, a terminal device 101 may move from a coverage area of a second access network device 102-2 to a coverage area of a first access network device 102-1. Both the first access network device 102-1 and the second access network device 102-2 are access network devices 102. A core network device 103 may be connected to each access network device 102. There may be a communications interface between the core network device 103 and each access network device 102. The communications interface may be referred to as, for example, an N2 interface or an NG interface. Optionally, there may be a communications interface between the access network devices 102, and the communications interface may be referred to as, for example, an Xn interface.

The core network device 103 may have a common control network function, or have functions such as providing access and mobility management for a user. The core network device 103 may be, for example, an AMF, or may be another type of core network device listed above. The access network device 102 may be the LTE base station, the base station in 5G, the CU, the DU, or the like listed above.

Optionally, when the terminal device 101 is in a connected state, the first access network device 102-1 may be a target access network device, and the second access network device 102-2 may be a source access network device. Optionally, when the terminal device 101 is in an idle state or an inactive state, the first access network device 102-1 may be a base station on which the terminal device 101 currently camps, and may be referred to as a new access network device or a new base station. The second access network device 102-2 may be a base station on which the terminal device 101 camped last time, and may be referred to as an anchor access network device or an anchor base station.

Figure 2:
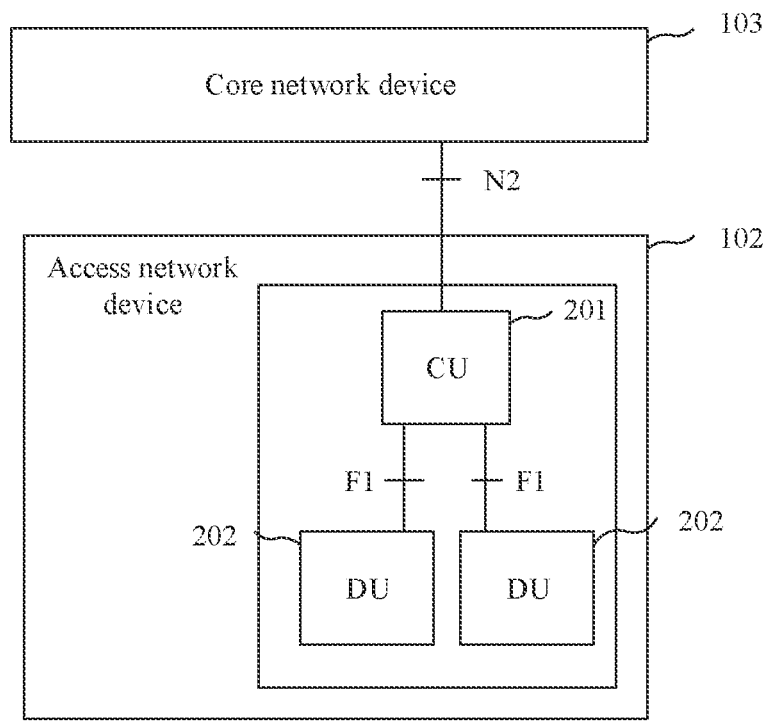
FIG. 2 is a schematic diagram of an application environment according to another embodiment of this application.

FIG. 2 is a schematic diagram of a possible application environment according to another embodiment of this application. As shown in FIG. 2, in a future network architecture, an access network device 103 may be divided into a centralized unit (CU) 201 and a distributed unit (DU) 202. The CU 201 and the DU 202 may be software-based or virtualized. Radio access network functions that need to be flexibly combined run in the CU 201, for example, functions at higher layers such as a service data adaptation protocol (SDAP) layer, a packet data convergence protocol (PDCP) layer, and a radio resource control (RRC) layer. RAN functions that are closely related to hardware and that have a relatively high requirement on real-time performance run in the DU 202, for example, functions at lower layers such as a radio link control protocol (RLC) layer, a physical layer (PHY), and a media access control layer (MAC).

The CU 201 and the DU 202 are connected to each other through a communications interface. The CU 201 and a core network device are also connected to each other through a communications interface. In this embodiment of this application, the communications interface between the CU 201 and the DU 202 may be referred to as an F1 interface. The interface between the CU 201 and the core network device may be referred to as an N2 interface or an NG interface. As shown in FIG. 2, one access network device 102 may include one CU 201 and one or more DUs 202. The CU 201 and the DU 202 are connected to each other through an F1 interface. One DU 202 can be connected to only one CU 201, and one CU 201 may be connected to one or more DUs 202.

Figure 3:
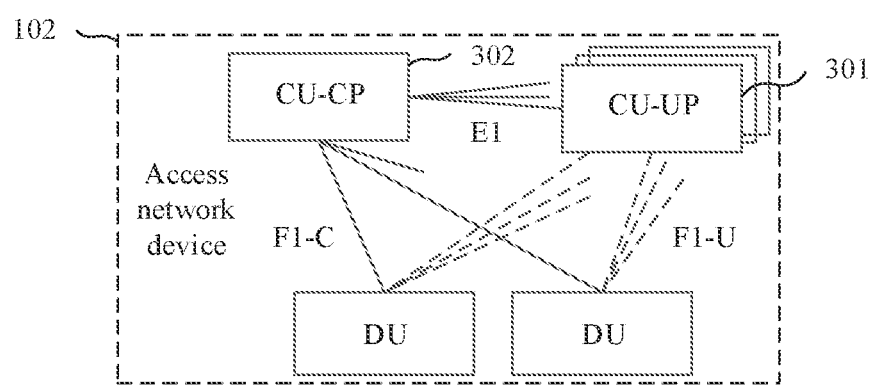
FIG. 3 is a schematic diagram of an application environment according to another embodiment of this application.

FIG. 3 is a schematic diagram of a possible application environment according to another embodiment of this application. Based on the architecture in FIG. 2, a new architecture is provided in FIG. 3. To be specific, in the CU part, the CU is divided into a centralized unit-user plane (CU-UP) 301 and a centralized unit-control plane (CU-CP) 302. The CU-UP 301 and the CU-CP 302 may be on different physical devices. There may be an open interface between the CU-UP 301 and the CU-CP 302, and the interface may be referred to as an E1 interface. In addition, there may be an interface between the DU and each of the CU-UP 301 and the CU-CP 302. For example, an interface between the CU-CP 302 and the DU is an F1-C interface, and an interface between the CU-UP 301 and the DU is an F1-U interface.

The architecture in FIG. 3 may have the following characteristics: One access network device 102 may include one CU-CP 302, a plurality of CU-UPs 302, and a plurality of DUs. One DU can be connected to only one CU-CP 302. One CU-UP 301 can be connected to only one CU-CP 302. One DU may be connected to a plurality of CU-UPs 301 under control of the same CU-CP 302. One CU-UP 301 may be connected to a plurality of DUs under control of the same CU-CP 302.

Figure 4:
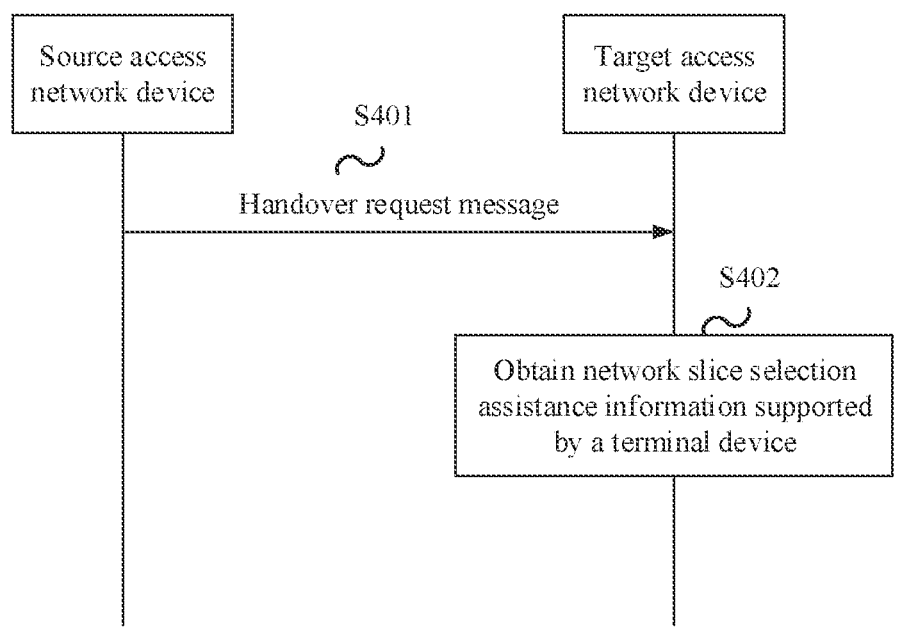
FIG. 4 is a schematic flowchart of a communication method according to an embodiment of this application.

FIG. 4 is a schematic flowchart of a communication method according to an embodiment of this application. The method in FIG. 4 includes the following steps.

S401. A target access network device receives a handover request message sent by a source access network device. Correspondingly, the source access network device sends the handover request message to the target access network device. The handover request message is used to request to hand over a terminal device from the source access network device to the target access network device.

Optionally, the terminal device may be in a connected state. The terminal device may move from a coverage area of the source access network device to a coverage area of the target access network device. The terminal device may perform cell measurement, and report a measurement result to the source access network device. The source access network device may determine, based on the measurement result, to hand over the terminal device to the target access network device.

Optionally, the handover request message may include a list of one or more sessions that need to be established by the target access network device for the terminal device and S-NSSAI corresponding to each session, and the list of sessions may include all sessions currently being performed by the terminal device. The list of sessions may further include an identifier of a QoS flow included in each session and corresponding QoS flow parameter information.

S402. The target access network device obtains network slice selection assistance information (NSSAI) supported by the terminal device. The network slice selection assistance information supported by the terminal device is used to indicate a network slice supported by the terminal device. For example, the network slice selection assistance information supported by the terminal device may be allowed NSSAI, and the allowed NSSAI may be used to indicate identifiers of all network slices supported by the terminal device.

Optionally, the network slice selection assistance information supported by the terminal device may be all S-NSSAI supported by the terminal device. The network slice selection assistance information supported by the terminal device may include identifiers (ID) of all network slices supported by the terminal device.

In the method in FIG. 4, the terminal device moves from coverage of the source access network device to coverage of the target access network device. In a process of handover of the terminal device between access network devices, the target access network device may obtain the network slice selection assistance information supported by the terminal device, to perform related communication and control.

Optionally, after obtaining the network slice selection assistance information supported by the terminal device, the target access network device may locally store the network slice selection assistance information supported by the terminal device.

Optionally, the target access network device may communicate with the terminal device based on the network slice selection assistance information supported by the terminal device.

For example, the target access network device may perform network slice-level differentiated processing based on the network slice selection assistance information supported by the terminal device. The differentiated processing includes at least one of the following processing manners: instructing the terminal device in an idle state or an inactive state to perform network slice-level inter-frequency cell reselection; selecting a target access network device for the terminal during handover; adjusting an access control parameter configuration, such as an access barring probability parameter or barring time; and configuring an RRC measurement parameter, such as a measurement periodicity, a measurement threshold, or a measurement object (for example, a carrier frequency band, a priority of a carrier frequency band, a frequency band of a synchronization message block, a measurement priority of a synchronization message block, or a carrier for a channel state information reference signal). Alternatively, when a dedicated radio resource management (RRM) policy is applied, the network slice selection assistance information supported by the terminal device is considered.

In this embodiment of this application, in a process in which the terminal device is handed over from the source access network device to the target access network device, the target access network device may obtain the network slice selection assistance information supported by the terminal device, so that the target access network device communicates with the terminal device based on the network slice selection assistance information supported by the terminal device, thereby improving communication efficiency.

Optionally, the technical solution in this embodiment of this application may be handover that is based on a direct interface (for example, an Xn interface). That is, handover information is directly exchanged between the source access network device and the target access network device through an interface. Alternatively, the technical solution in this embodiment of this application may be handover that is based on an indirect interface (for example, an N2 interface). That is, handover information is exchanged between the source access network device and the target access network device through a core network device. To be specific, the core network device, as a relay device, forwards the handover information to be exchanged between the source access network device and the target access network device.

Optionally, in the process of the handover of the terminal device between the access network devices, the source access network device and the target access network device may belong to a same registration area, or may belong to different registration areas. If the source access network device and the target access network device belong to a same registration area, the network slice selection assistance information supported by the terminal device before the handover is the same as that supported by the terminal device after the handover. If the source access network device and the target access network device belong to different registration areas, the network slice selection assistance information supported by the terminal device before the handover may be different from that supported by the terminal device after the handover, and therefore needs to be updated.

Optionally, there are a plurality of methods for obtaining, by the target access network device, the network slice selection assistance information supported by the terminal device. For example, the target access network device may obtain, from the core network device, the network slice selection assistance information supported by the terminal device. Alternatively, the target access network device may obtain, from the source access network device, the network slice selection assistance information supported by the terminal device.

In an example, the target access network device may obtain, from the core network device in the following manner, the network slice selection assistance information supported by the terminal device: The target access network device sends a path switch request message to the core network device. Correspondingly, the core network device receives the path switch request message from the target access network device. The path switch request message is used to request to hand over the terminal device from the source access network device to the target access network device. The target access network device receives a path switch request acknowledge message from the core network device. Correspondingly, the core network device sends the path switch request acknowledge message to the target access network device. The path switch request acknowledge message includes the network slice selection assistance information supported by the terminal device.

In this embodiment of this application, in the process in which the terminal device is handed over from the source access network device to the target access network device, the target access network device may obtain, from the core network device by using the path switch request message, the network slice selection assistance information supported by the terminal device, so that the target access network device communicates with the terminal device based on the network slice selection assistance information supported by the terminal device, thereby improving the communication efficiency.

In another example, if the target access network device obtains, from the core network device, the network slice selection assistance information supported by the terminal device, the following method may alternatively be used: The target access network device sends a registration request message to the core network device. Correspondingly, the core network device receives the registration request message from the target access network device. The registration request message is used to request to update a registration area of the terminal device. The target access network device receives a first message from the core network device. Correspondingly, the core network device sends the first message to the target access network device. The first message includes a registration accept message and the network slice selection assistance information supported by the terminal device, and the registration accept message is used to respond to the registration request message.

Optionally, the first message may be an N2 interface signaling message, for example, a downlink non-access stratum transmission message.

In this embodiment of this application, in the process in which the terminal device is handed over from the source access network device to the target access network device, the target access network device may obtain, from the core network device in a registration update process, the network slice selection assistance information supported by the terminal device, so that the target access network device communicates with the terminal device based on the network slice selection assistance information supported by the terminal device, thereby improving the communication efficiency.

Optionally, the foregoing method further includes: Before sending the registration request message, the target access network device receives the registration request message from the terminal device. Correspondingly, the terminal device sends the registration request message to the target access network device. Optionally, the foregoing method further includes: After receiving the first message, the target access network device sends a second message to the terminal device. Correspondingly, the terminal device receives the second message sent by the target access network device. The second message includes the registration accept message and the network slice selection assistance information supported by the terminal device.

Equivalently, the target access network device transparently transmits the registration request message to the core network device. To be specific, the registration request message may be a non-access stratum (NAS) message. Similarly, equivalently, the target access network device transparently transmits the registration accept message to the terminal device. The registration accept message may be NAS information. The second message may be an RRC message or an air interface message of another type.

It should be noted that if the source access network device and the target access network device belong to a same registration area, the registration area does not need to be updated. In other words, the terminal device does not need to send the registration request message to the target access network device. The terminal device needs to send the registration request message to the target access network device only when the source access network device and the target access network device belong to different registration areas.

It should be noted that names of the messages are not limited in this embodiment of this application. The names of the messages are merely used as examples. Alternatively, the messages may have other names provided that same functions are implemented by using the messages.

In this embodiment of this application, in the process in which the terminal device is handed over from the source access network device to the target access network device, the target access network device may send, to the terminal device in the registration update process, the network slice selection assistance information supported by the terminal device, so that the terminal device performs related communication based on the network slice selection assistance information, thereby improving the communication efficiency.

In another example, if the target access network device obtains, from the source access network device, the network slice selection assistance information of the terminal device, the following manner may be used: The handover request message includes the network slice selection assistance information supported by the terminal device. The target access network device may obtain, from the handover request message sent by the source access network device, the network slice selection assistance information supported by the terminal device.

In this embodiment of this application, in the process in which the terminal device is handed over from the source access network device to the target access network device, the handover request message sent by the source access network device to the target access network device includes the network slice selection assistance information supported by the terminal device, so that the target access network device communicates with the terminal device based on the network slice selection assistance information, thereby improving the communication efficiency.

Further, the handover request message may include registration area information of the terminal device, and the registration area information is used to indicate a tracking area (tracking area) corresponding to the terminal device.

For example, the registration area information may include a tracking area list, and each tracking area may be indicated by using a tracking area code TAC). For example, Table 1 below is an example of the registration area information.

TABLE 1

| TAI list |
| --- |
| >TAC |

The target access network device may determine, based on the registration area information, whether the source access network device and the target access network device belong to a same registration area, in other words, determine whether the target access network device is located in the registration area of the terminal device. If the target access network device is also located in the registration area of the terminal device, it indicates that the network slice selection assistance information of the terminal device is valid. If the target access network device is not located in the registration area of the terminal device, it indicates that the network slice selection assistance information of the terminal device is invalid, and the target access network device needs to obtain updated network slice selection assistance information of the terminal device in another manner. For example, the target access network device may obtain, from the core network device, the updated network slice selection assistance information of the terminal device. For example, the target access network device may specifically obtain, by using the path switch request acknowledge message or the first message sent by the core network device, the updated network slice selection assistance information of the terminal device.

In this embodiment of this application, in the process in which the terminal device is handed over from the source access network device to the target access network device, the handover request message sent by the source access network device to the target access network device includes the registration area information of the terminal device, so that the target access network device determines, based on the registration area information, whether the network slice selection assistance information, supported by the terminal device, in the handover request message is valid, thereby improving the communication efficiency.

Figure 5:
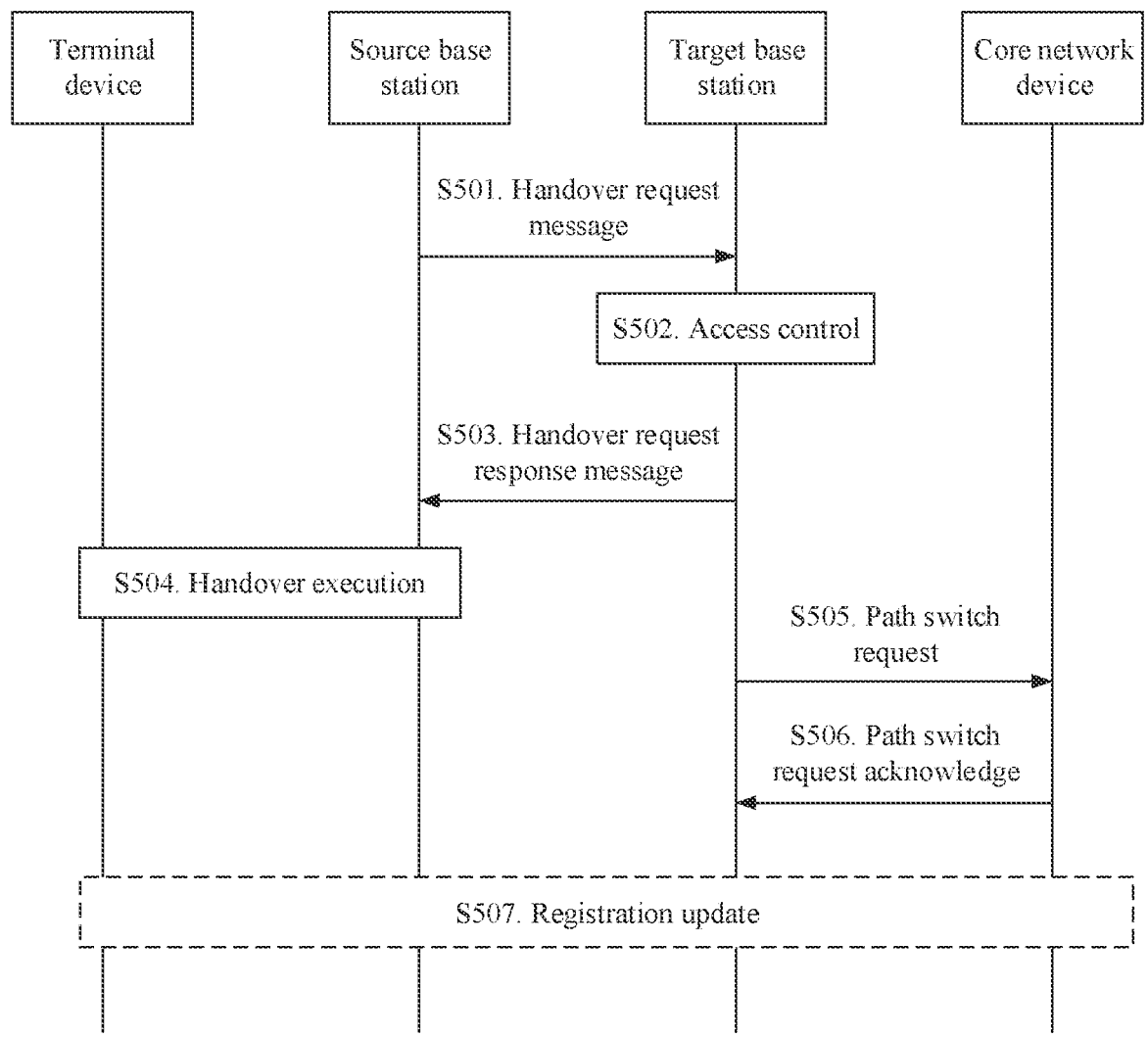
FIG. 5 is a diagram of a specific example of a communication method according to another embodiment of this application.

FIG. 5 shows a specific example of a communication method according to another embodiment of this application. The source access network device in FIG. 4 may be a source base station in FIG. 5, and the target access network device in FIG. 4 may be a target base station in FIG. 5. There may be a communications interface, for example, an Xn interface, between the source base station and the target base station. If there is no communications interface between the source base station and the target base station, a core network device may serve as a relay device to forward information to be exchanged between the source base station and the target base station. In other words, the source base station and the target base station communicate with each other through an N2 interface or an NG interface. The method in FIG. 5 includes the following steps.

S501. The source base station sends a handover request message to the target base station. Correspondingly, the target base station receives the handover request message from the source base station.

Optionally, the handover request message may include network slice selection assistance information supported by a terminal device, for example, allowed NSSAI. The target base station may perform RRC connection reconfiguration on the terminal device based on the allowed NSSAI, for example, configure an RRC measurement parameter (such as a measurement periodicity, a measurement threshold, or a measurement object (for example, a carrier frequency band, a priority of a carrier frequency band, a frequency band of a synchronization message block, a measurement priority of a synchronization message block, or a carrier for a channel state information reference signal)). The target base station may alternatively perform network slice information-based admission control (for example, reject a handover request from the source base station when congestion occurs in a slice of the allowed NSSAI) based on the allowed NSSAI.

Optionally, the handover request message may further include current registration area information, for example, a TAI list, of the terminal device. The target base station may determine, based on the registration area information, whether the allowed NSSAI is applicable to the target base station.

Optionally, the handover request message may include a list of one or more sessions that need to be established by the target base station for the terminal and S-NSSAI corresponding to each session, and the list of sessions includes all sessions currently being performed by the terminal. In addition, the list of sessions includes an ID of a QoS flow included in each session and corresponding QoS flow parameter information.

S502. The target base station performs access control.

For example, the target base station may perform access control based on a network slice supported by the target base station, the received network slice selection assistance information supported by the terminal device, a resource usage status of the target base station, and the like.

S503. The target base station sends a handover request response message to the source base station. Correspondingly, the source base station receives the handover request response message from the target base station.

Optionally, the handover request response message may include a list of one or more sessions accepted by the target base station and a list of one or more sessions rejected by the target base station. The handover request response message also includes a list of one or more QoS flows accepted on the sessions accepted by the target base station, the list of sessions rejected by the target base station, and a reject cause.

S504. The source base station performs a handover execution (handover execution) with the terminal device.

Specifically, the source base station sends a handover command message to the terminal. Optionally, the handover command message includes bearer configuration information of the target base station.

After receiving the handover command message, the terminal device may perform random access to the target base station, and send a handover acknowledgement message to the target base station after a random access process is completed.

S505. The target base station sends a path switch request (path switch request) message to the core network device.

Optionally, the path switch request message includes the accepted sessions and the sessions that are not accepted by the target base station in a handover execution process, in other words, the accepted sessions and the rejected sessions. The path switch request message also includes the list of QoS flows accepted on the sessions accepted by the target base station, the list of sessions rejected by the target base station, and the reject cause.

S506. The core network device sends a path switch request acknowledge message to the target base station.

Optionally, the path switch request acknowledge message may include the network slice selection assistance information supported by the terminal device.

If the target base station and the source base station belong to different registration areas, the path switch request acknowledge message may include updated network slice selection assistance information supported by the terminal device. If the target base station and the source base station belong to a same registration area, the network slice selection assistance information supported by the terminal device is not updated.

Optionally, if the target base station and the source base station belong to different registration areas, the method may further include the following step 507.

S507. The terminal device performs registration update with the core network device.

Specifically, the terminal device sends a registration request message to the core network device, and the core network device sends a registration accept message to the terminal device through the target base station.

Optionally, in a process in which the terminal device performs registration update, the core network device may send N2 interface signaling to an access network device, and the N2 interface signaling includes the registration accept message and the updated network slice selection assistance information supported by the terminal device. The access network device may obtain, by using the N2 interface signaling, the updated network slice selection assistance information supported by the terminal device.

The registration request message and the registration accept message each may be NAS information.

It should be noted that if the target base station and the source base station belong to a same registration area, step 507 does not need to be performed.

It should be noted that sequence numbers in this embodiment of this application impose no limitation on a time sequence of performing the steps. For example, step S504 in FIG. 5 may be performed before step S505, or may be performed after step S505. This is not limited in this embodiment of this application.

Figure 6:
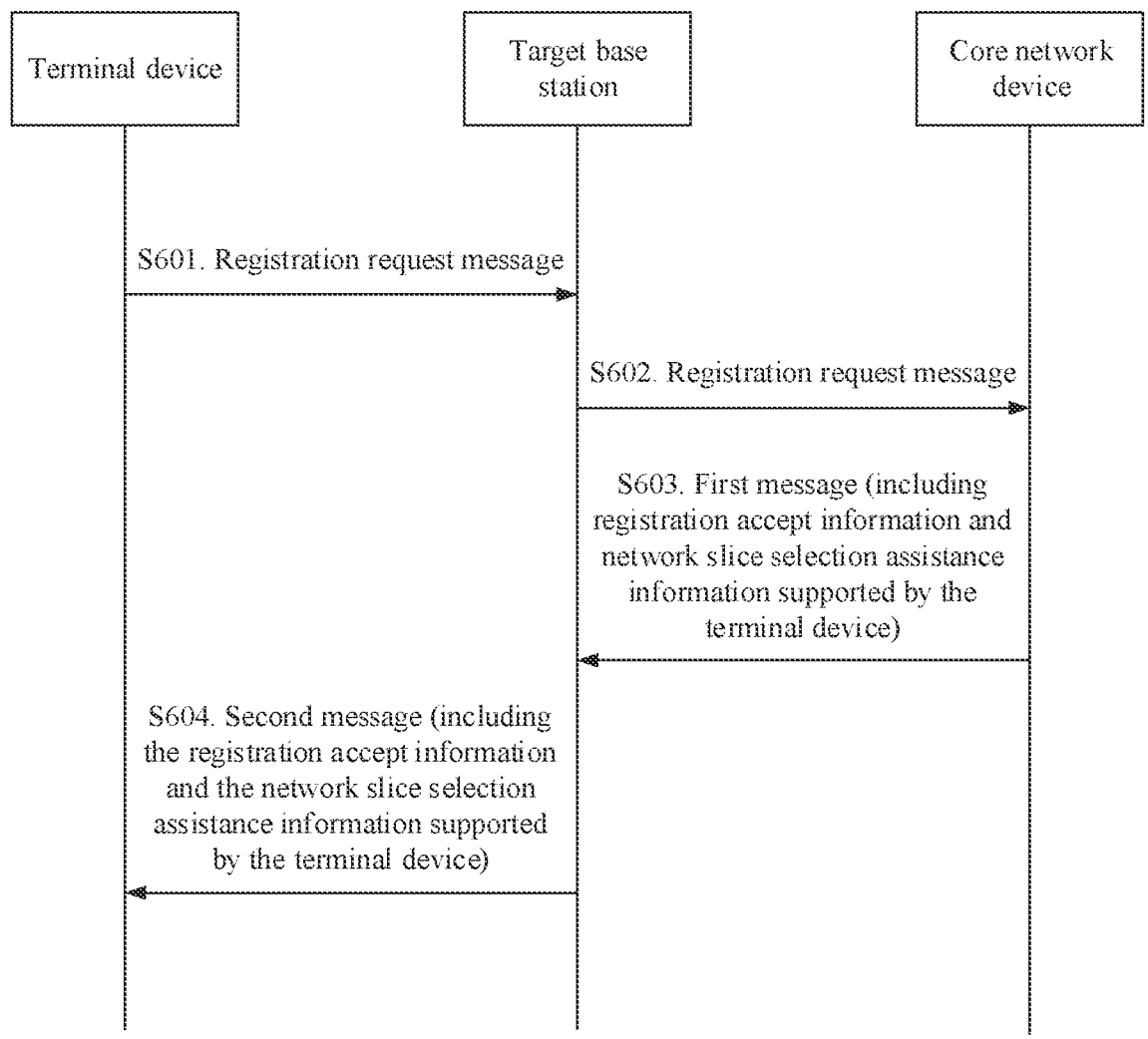
FIG. 6 is a diagram of a specific example of a communication method according to another embodiment of this application.

FIG. 6 shows a specific example of a communication method according to another embodiment of this application. FIG. 6 shows a specific process of performing step 507 in FIG. 5. As shown in FIG. 6, the method in FIG. 6 includes the following steps.

S601. A terminal device sends a registration request message to a target base station. Correspondingly, the target base station receives the registration request message from the terminal device.

Optionally, the registration request message is a NAS message, that is, the target base station does not parse the registration request message.

S602. The target base station sends the registration request message to a core network device. Correspondingly, the core network device receives the registration request message from the target base station.

In other words, the target base station may transparently transmit the registration request message.

S603. The core network device sends a first message to the target base station. Correspondingly, the target base station receives the first message from the core network device. The first message includes a registration accept message and network slice selection assistance information supported by the terminal device.

Optionally, the first message may be an N2 interface message, and the registration accept message may be NAS information. In other words, an access network device may parse the first message, but cannot parse the registration accept message. The access network device may obtain, by parsing the first message, the network slice selection assistance information supported by the terminal device.

S604. The target base station sends a second message to the terminal device. The second message includes the registration accept message. Correspondingly, the terminal device receives the second message from the target base station.

Optionally, the second message may further include the network slice selection assistance information supported by the terminal device, so that the terminal device obtains updated network slice selection assistance information supported by the terminal device.

In this embodiment of this application, in a process in which the terminal device is handed over from a source access network device to a target access network device, the terminal device may receive, from the target access network device in a registration update process, the network slice selection assistance information supported by the terminal device, so that the terminal device performs related communication based on the network slice selection assistance information, thereby improving communication efficiency.

Figure 7:
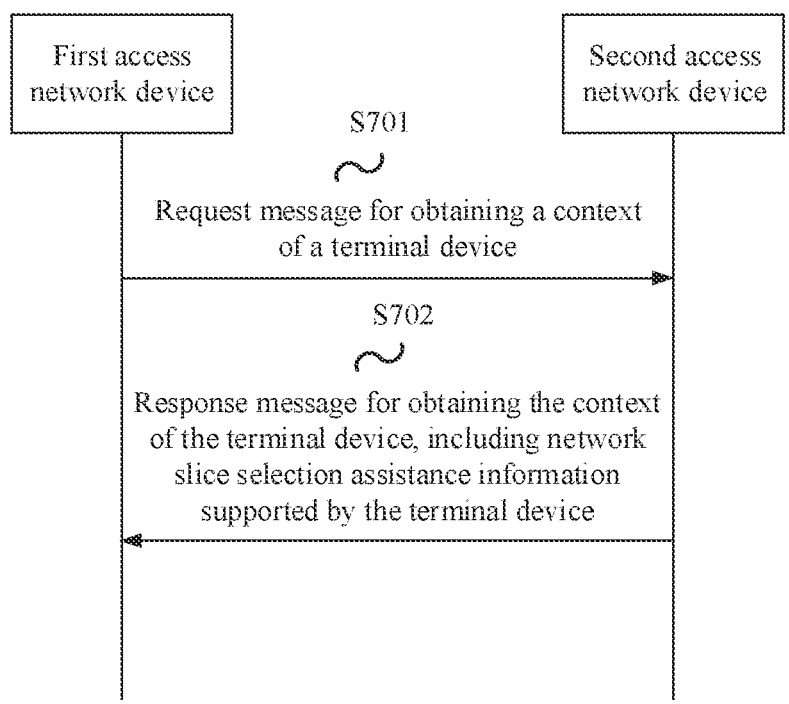
FIG. 7 is a schematic flowchart of a communication method according to another embodiment of this application.

FIG. 7 is a schematic flowchart of a communication method according to another embodiment of this application. In the method in FIG. 7, when a terminal device is in an inactive state, the terminal device moves from a second access network device to a first access network device. In addition, in a process in which the terminal device is switched from the inactive state to a connected state, the first access network device needs to obtain a context of the terminal device from the second access network device. A terminal device context response message sent by the second access network device to the first access network device may include network slice selection assistance information supported by the terminal device, so that the first access network device communicates with the terminal device based on the network slice selection assistance information. The method in FIG. 7 includes the following steps.

S701 The first access network device sends, to the second access network device, a request message for obtaining the context of the terminal device. Correspondingly, the second access network device receives, from the first access network device, the request message for obtaining the context of the terminal device. The request message for obtaining the context of the terminal device is used to request the context of the terminal device. The first access network device is an access network device on which the terminal device currently camps, and the second access network device is an access network device on which the terminal device camped last time. The first access network device may also be referred to as a new access network device, a new base station, or a new serving base station. The second access network device may also be referred to as an anchor access network device, an anchor base station, or a last-camping base station.

Optionally, the terminal device is switched from the inactive state to the connected state. To be specific, the terminal device in the inactive state moves from the coverage area of the second access network device to the coverage area of the first access network device, and is switched from the inactive state to the connected state when the first access network device serves the terminal device.

The camping may also be referred to as serving. To be specific, the first access network device may be an access network device serving the terminal device, and the second access network device is an access network device that served the terminal device last time, namely, an access network device that served the terminal device for the last time.

S702. The first access network device receives, from the second access network device, the response message for obtaining the context of the terminal device. Correspondingly, the second access network device sends, to the first access network device, the response message for obtaining the context of the terminal device. The response message for obtaining the context of the terminal device includes the network slice selection assistance information supported by the terminal device, and the network slice selection assistance information is used to indicate a network slice supported by the terminal device.

Optionally, the response message for obtaining the context of the terminal device may further include the context of the terminal device.

In this embodiment of this application, in the process in which the terminal device is switched from the inactive state to the connected state, the first access network device on which the terminal device currently camps receives, from the second access network device on which the terminal device camped last time, the response message for obtaining the context of the terminal device. The response message for obtaining the context of the terminal device includes the network slice selection assistance information supported by the terminal device, so that the first access network device communicates with the terminal device based on the network slice selection assistance information, thereby improving communication efficiency.

Optionally, the method in FIG. 7 further includes: The first access network device receives registration area information of the terminal device from the second access network device. The registration area information is used to indicate a tracking area corresponding to the terminal device.

In an example, the registration area information may alternatively be carried in the terminal device context response message.

In this embodiment of this application, in the process in which the terminal device is switched from the inactive state to the connected state, the first access network device on which the terminal device currently camps receives the registration area information of the terminal device from the second access network device on which the terminal device camped last time, so that the first access network device determines, based on the registration area information, whether the network slice selection assistance information, supported by the terminal device, sent by the second access network device is valid, thereby improving the communication efficiency.

Figure 8:
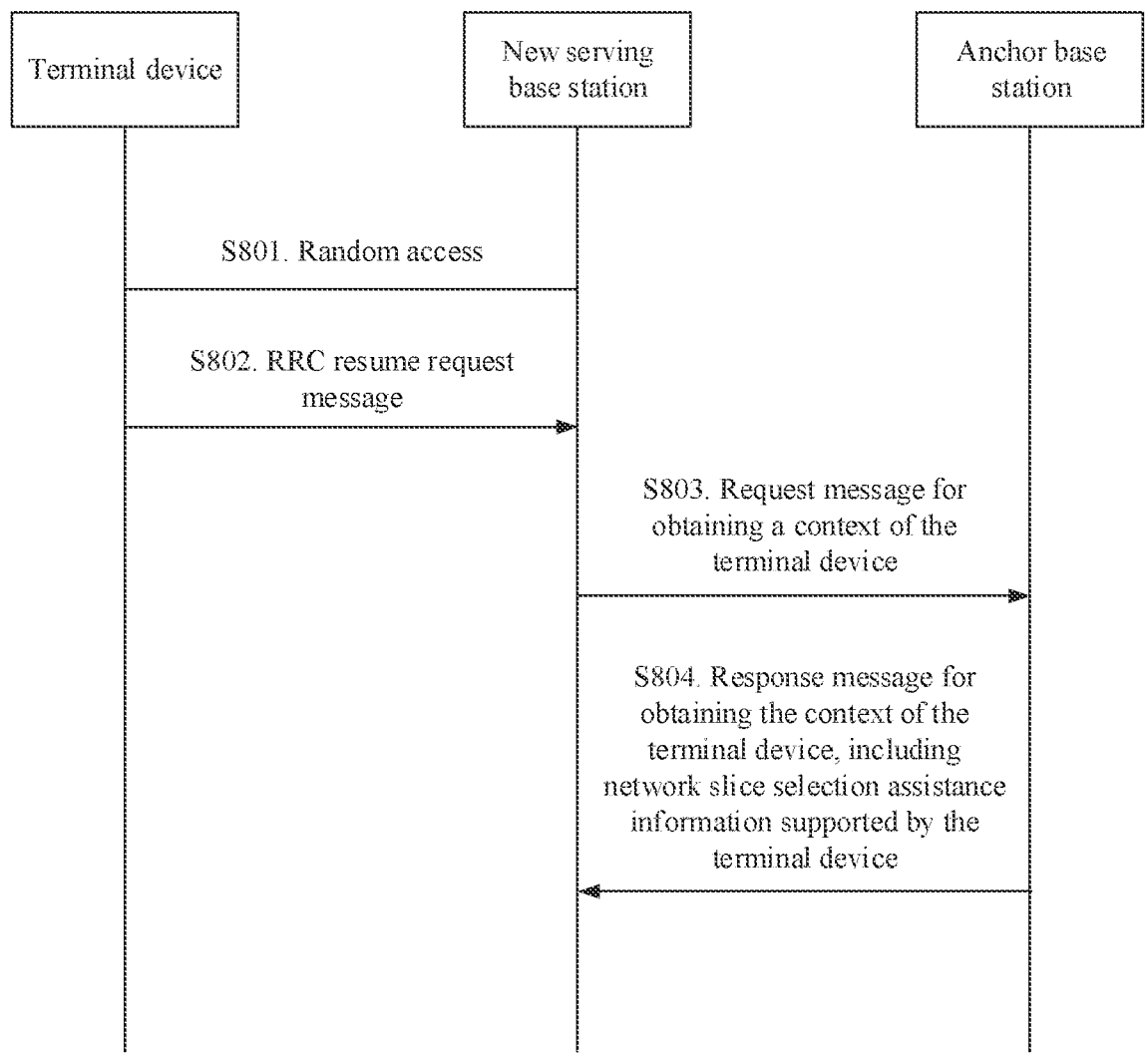
FIG. 8 is a diagram of a specific example of a communication method according to another embodiment of this application.

FIG. 8 shows a specific example of a communication method according to another embodiment of this application. The first access network device in FIG. 7 may be a new serving base station in FIG. 8, and the second access network device in FIG. 7 may be an anchor base station in FIG. 8. In FIG. 8, a terminal device in an inactive state moves from the anchor base station to the new serving base station. The terminal device requests to be switched from the inactive state to a connected state. In a process of obtaining a context of the terminal device from the anchor base station, the new serving base station obtains network slice selection assistance information supported by the terminal device. The method in FIG. 8 includes the following steps.

S801. The terminal device performs random access to the new serving base station.

S802. The terminal device sends an RRC resume request message to the new serving base station.

The RRC resume request message may be used to indicate a resume request cause, for example, a request for periodic reminding of an area update, or an initial signaling request of the terminal.

S803. The new serving base station sends, to the anchor base station, a request message for obtaining the context of the terminal device.

S804. The anchor base station sends, to the new serving base station, a response message for obtaining the context of the terminal device.

Optionally, the response message for obtaining the context of the terminal device may include the network slice selection assistance information supported by the terminal device, namely, allowed NSSAI. The new serving base station may perform RRC connection reconfiguration on the terminal device based on the allowed NSSAI, for example, configure an RRC measurement parameter or perform network slice information-based admission control.

In this embodiment of this application, in a process in which the terminal device is switched from the inactive state to the connected state, a first access network device on which the terminal device currently camps receives, from a second access network device on which the terminal device camped last time, the response message for obtaining the context of the terminal device. The response message for obtaining the context of the terminal device includes the network slice selection assistance information supported by the terminal device, so that the first access network device communicates with the terminal device based on the network slice selection assistance information, thereby improving communication efficiency.

Figure 9:
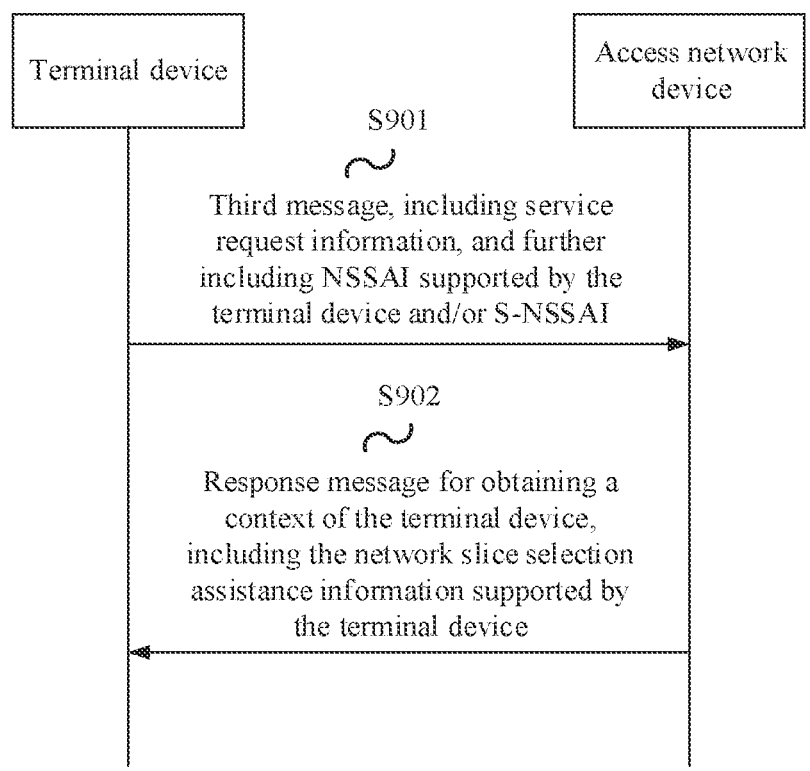
FIG. 9 is a schematic flowchart of a communication method according to another embodiment of this application.

FIG. 9 is a schematic flowchart of a communication method according to another embodiment of this application. As shown in FIG. 9, the method in FIG. 9 includes the following steps.

S901. An access network device receives a third message from a terminal device. Correspondingly, the terminal device sends the third message to the access network device. The third message includes service request information, and the service request message is used to request to switch the terminal device from an idle state to a connected state. The third message further includes at least one of the following: network slice selection assistance information supported by the terminal device and single network slice selection assistance information (S-NSSAI).

The network slice selection assistance information supported by the terminal device may be used to indicate a network slice supported by the terminal device, and the single network slice selection assistance information may be used to indicate a network slice triggering the service request message.

The network slice selection assistance information supported by the terminal device may be a requested network slice (for example, requested NSSAI) of the terminal device.

The service request message may be non-access stratum (NAS) information. That is, the access network device cannot parse the service request message, and equivalently, the access network device transparently transmits the service request message.

Optionally, the third message may be an RRC layer message. For example, the third message may be an RRC setup request message or an RRC setup complete message.

Optionally, after receiving the third message, the access network device may communicate with the terminal device based on the network slice selection assistance information supported by the terminal device.

S902. The access network device sends a fourth message to a core network device. Correspondingly, the core network device receives the fourth message from the access network device. The fourth message includes the service request message.

The fourth message may be an N2 interface message. That the access network device sends the service request message to the core network device is equivalent to that the access network device transparently transmits the service request message to the core network device.

In this embodiment of this application, in a process in which the terminal device is switched from the idle state to the connected state, the access network device receives the third message sent by the terminal device, and the third message includes the service request message, and further includes the network slice selection assistance information supported by the terminal device and/or the single network slice selection assistance information (S-NSSAI) triggering the service request message, so that the access network device obtains, based on the third message, the network slice selection assistance information supported by the terminal device and/or the single network slice selection assistance information, to perform related control or communication.

After receiving the single network slice selection assistance information, the access network device may perform, based on the single network slice selection assistance information, control and communication related to the service request message. For example, when no congestion occurs in a network slice triggering the service request message, the access network device forwards the service request message to the core network device. Alternatively, when congestion occurs in a network slice triggering the service request message, the access network device does not send a second service request message to the core network device. The access network device releases an RRC connection of the terminal device, for example, sends an RRC connection release message to the terminal device. The access network device indicates an RRC connection release cause, for example, tracking area update, in the RRC connection release message. Optionally, the core network device may send a notification message to the access network device, to indicate specific network slices in which congestion occurs. For example, an AMF may include the S-NSSAI in an N2 interface control message to be sent to a 5G-AN node, to indicate congestion in a network slice in a core network.

Figure 10:
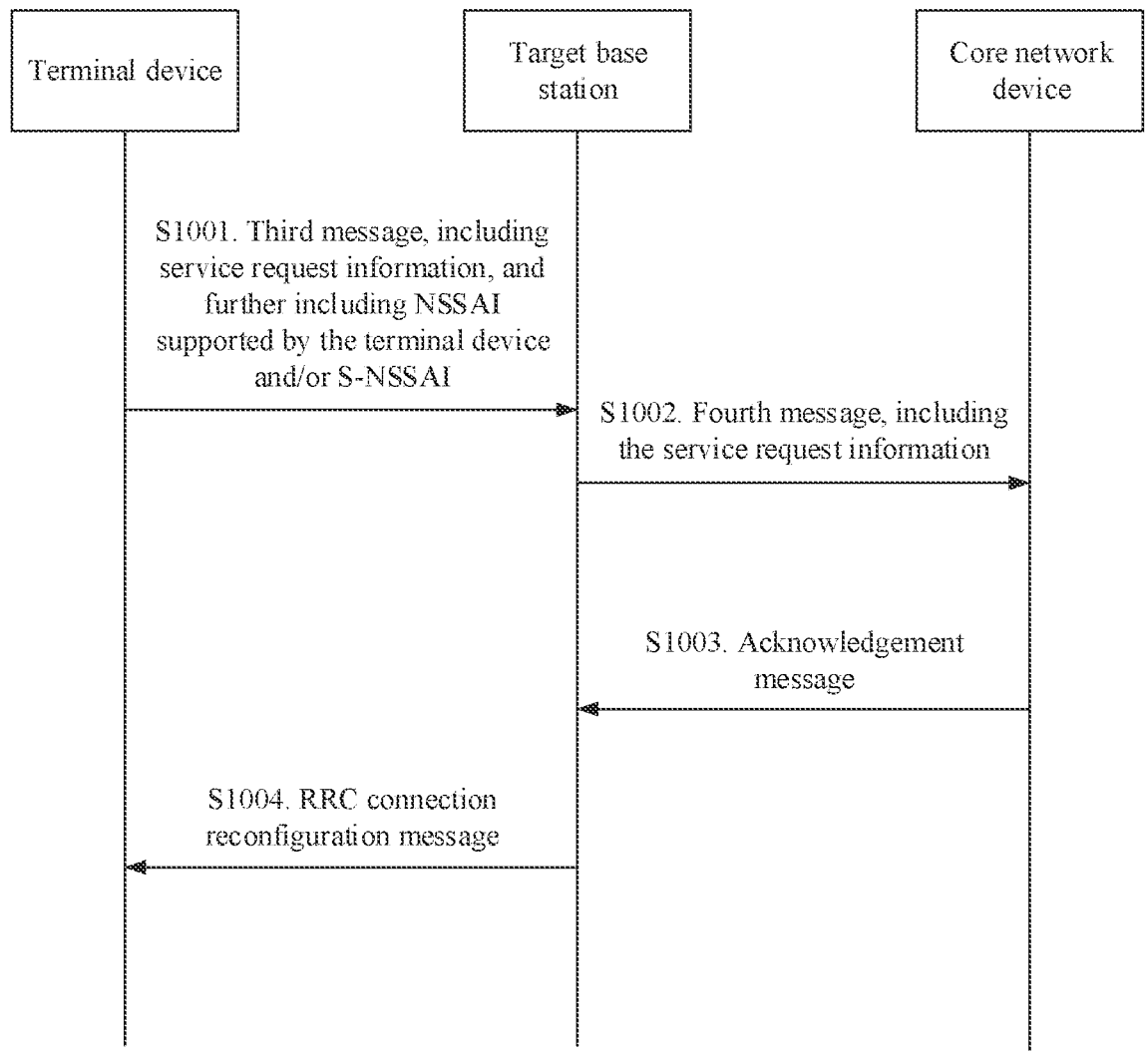
FIG. 10 is a diagram of a specific example of a communication method according to another embodiment of this application.

FIG. 10 shows a specific example of a communication method according to an embodiment of this application. In FIG. 10, a terminal device in an idle state moves, to a new base station, from a base station on which the terminal device camped last time. In addition, the terminal device requests to be switched from the idle state to a connected state. The terminal device may send, to an access network device, network slice selection assistance information supported by the terminal device. As shown in FIG. 10, the method in FIG. 10 includes the following steps.

S1001. The terminal device sends a third message to the access network device. The third message includes a service request message, and the service request message is used to request to switch the terminal device from the idle state to the connected state. The third message may further include requested NSSAI. The requested NSSAI may include the network slice selection assistance information supported by the terminal device (for example, allowed NSSAI) and/or single network slice selection assistance information (S-NSSAI). The third message may further include the requested network slice selection assistance information of the terminal.

When the terminal device is in the idle state, if uplink data needs to be sent, generation of the service request message may be triggered.

The allowed NSSAI may refer to all network slices supported by the terminal device. The S-NSSAI may be used to indicate a network slice triggering the service request message.

Optionally, the service request message may be NAS information, and the third message may be an RRC message. To enable the access network device to sense slice information corresponding to the terminal device, the third message may carry the allowed NSSAI and/or the S-NSSAI.

For example, the third message may be an RRC setup request message or an RRC setup complete message.

S1002. The access network device sends a fourth message to a core network device. The fourth message includes the service request message.

In some examples, the access network device may receive, from the core network device, information about specific network slices in which congestion occurs. The access network device may perform the following behavior based on the allowed NSSAI: For example, when congestion occurs in the network slice triggering the service request message, the access network device does not send the fourth message to the core network device. The access network device may release an RRC connection of the terminal device, for example, send an RRC connection release message to the terminal device. The access network device indicates an RRC connection release cause, for example, tracking area update, in the RRC connection release message. Otherwise, the access network device sends the fourth message to the core network device. Optionally, the access network device may alternatively trigger the terminal device to perform cell reselection and/or registration update.

S1003. A core network sends an acknowledgement message to the access network device.

S1004. The access network device sends an RRC connection reconfiguration message to the UE.

In this way, the terminal device enters the connected state, and can perform a normal UL/DL data transmission process.

In this embodiment of this application, in a process in which the terminal device is switched from the idle state to the connected state, the access network device receives the third message sent by the terminal device, and the third message includes the service request message, and further includes the network slice selection assistance information supported by the terminal device and/or the single network slice selection assistance information (S-NSSAI) triggering the service request message, so that the access network device obtains, based on the third message, the network slice selection assistance information supported by the terminal device and/or the single network slice selection assistance information, to perform related control or communication.

Figure 11:
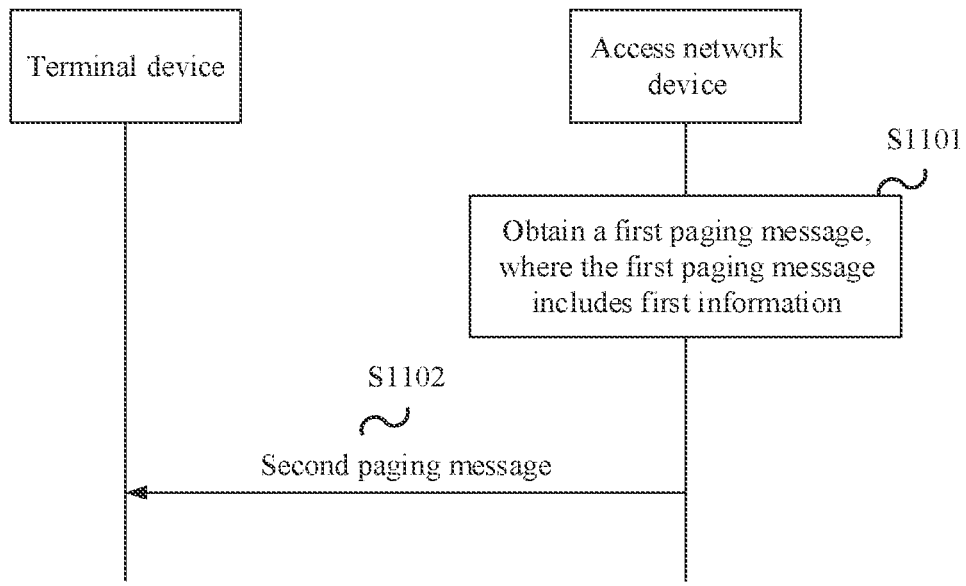
FIG. 11 is a schematic flowchart of a paging method according to an embodiment of this application.

FIG. 11 is a schematic flowchart of a paging method according to an embodiment of this application. As shown in FIG. 11, the method includes the following steps.

S1101. An access network device receives a first paging message. The first paging message includes first information, and the first information includes at least one of the following: information about a network slice, a QFI, a 5QI, an allocation and retention priority (ARP), and a DNN.

The first information may be used to indicate a factor triggering the first paging message. For example, the network slice may trigger the first paging message. The information about the network slice may include at least one of the following: single network slice selection assistance information (S-NSSAI) triggering the first paging message, and network slice selection assistance information supported by a terminal device. In other words, the S-NSSAI triggers the first paging message. The network slice selection assistance information supported by the terminal device may be all S-NSSAI supported by the terminal device. Alternatively, the first information may indicate a specific QFI or a specific 5QI triggering the first paging message. Alternatively, the first paging message may indicate a specific DNN triggering the first paging message. Alternatively, the first paging message may indicate a specific ARP triggering the first paging message.

S1102. After receiving the first paging message, the access network device sends a second paging message to the terminal device. Correspondingly, the terminal device receives the second paging message.

Optionally, the access network device may send the second paging message based on the first paging message. For example, the access network device may determine the first paging message as the second paging message, and send the second paging message. Alternatively, the access network device may delete the first information from the first paging message, to obtain the second paging message; and send the second paging message.

In this embodiment of this application, the paging message received by the access network device may include the first information, and the first information may include the information about the network slice, the QFI, the 5QI, the ARP, or the DNN. The access network device may perform related control or communication based on the first information, to improve communication efficiency.

For example, the access network device determines, based on the information about the network slice, a policy such as a paging priority, a quantity of paging times, or a paging area (a list including one or more cells), for sending the second paging message by the access network device. In an implementation, the access network device preferentially sends the second paging message for a high-reliability low-latency network slice, or sends the second paging message in a larger cell range, or sends the second paging message for a plurality of times.

For example, the access network device determines, based on the QFI or the 5QI information, a policy such as a paging priority, a quantity of paging times, or a paging area (a list including one or more cells), for sending the second paging message by the access network device. In an implementation, the access network device preferentially sends the second paging message for a QFI or a 5QI having a highest priority, or sends the second paging message in a larger cell range, or sends the second paging message for a plurality of times.

For example, the access network device determines, based on the ARP information, a policy such as a paging priority, a quantity of paging times, or a paging area (a list including one or more cells), for sending the second paging message by the access network device. In an implementation, the access network device preferentially sends the second paging message for an ARP having a highest priority, or sends the second paging message in a larger cell range, or sends the second paging message for a plurality of times.

Optionally, the second paging message sent by the access network device to the terminal device may include the first information, or may not include the first information.

Optionally, the terminal device may be in an idle state, and that an access network device receives a first paging message includes: The access network device receives the first paging message from a core network device. Correspondingly, the core network device sends the first paging message to the access network device.

In other words, when the terminal device is in the idle state, the first paging message is initiated by the core network device. For example, when finding that data of the terminal device arrives, the core network device triggers core network initiated paging (CN initiated paging).

In this embodiment of this application, when the terminal device is in the idle state, the first paging message received by the access network device from the core network device may include the first information, and the first information may include one or more of the following: the information about the network slice, the QFI, the 5QI, the ARP, and the DNN. The access network device may perform related control or communication based on the first information, to improve communication efficiency.

Optionally, S-NSSAI triggering a paging message may be carried in the paging message used for RAN paging and RAN congestion control. Therefore, in a RAN, dedicated slice processing may be performed based on a service-level agreement (SLA) requirement in which a network slice is considered. For example, the access network device may consider a network slice-level paging priority, an area supported by a network slice, or the like. Because a paging request may be triggered by a specific network slice, it is more valuable for an AMF to transmit corresponding S-NSSAI triggering the paging message.

In another potential use solution, the NSSAI is used for RAN overload control. For example, when the network slice in the paging message is overloaded, the access network device may not broadcast an RRC paging message. Transmitting the S-NSSAI triggering the paging is more advantageous than transmitting all the S-NSSAI supported by the terminal device.

For example, that the access network device sends a second paging message to the terminal device includes: When no congestion occurs in the radio access network, the access network device sends the second paging message to the terminal device. The method further includes: When congestion occurs in the radio access network, the access network device skips sending the second paging message, and sends paging failure indication information to the core network device, to indicate that the paging fails.

In this embodiment of this application, the access network device may determine, based on a congestion status of the radio access network, whether to send the second paging message, thereby improving the communication efficiency.

Optionally, the access network device may determine a priority of the first paging message based on the first information. For example, different network slices correspond to different priorities. The access network device may determine, based on the first information, a priority of a network slice supported by the terminal device, or a priority of a network slice triggering the first information, and determine the priority of the first paging message based on the priority of the network slice. When the access network device receives a plurality of paging messages, the access network device may preferentially send a paging message with a higher priority or preferentially allocate a resource to a paging message with a higher priority based on priorities corresponding to the paging messages.

In this embodiment of this application, the access network device may determine the priority of the first paging message based on the first information, and perform paging based on the priority of the first paging message, thereby improving the communication efficiency.

Optionally, the terminal device may be in an inactive state. In this case, it is assumed that the access network device is a first access network device, and that an access network device receives a first paging message includes: The first access network device receives the first paging message from a second access network device. Correspondingly, the second access network device sends the first paging message to the first access network device. The first access network device is an access network device on which the terminal device currently camps, and the second access network device is an access network device on which the terminal device camped last time.

In other words, when the terminal device is in the inactive state, the first paging message is initiated by the second access network device on which the terminal device camped last time. For example, when finding that data of the terminal device arrives, the core network device sends the first paging message to the first access network device. After receiving a terminal device context request message, the second access network device sends the downlink data to the first access network device.

In this embodiment of this application, when the terminal device is in the inactive state, the first paging message received, by the first access network device on which the terminal device currently camps, from the second access network device on which the terminal device camped last time may include the first information, and the first information may include at least one of the following: the information about the network slice, the QFI, the 5QI, the ARP, and the DNN. The access network device may perform related control or communication based on the first information, to improve the communication efficiency.

Optionally, the first access network device sends the second paging message based on the first information.

For example, that the first access network device sends a second paging message to the terminal device includes: When no congestion occurs in the radio access network, the first access network device sends the second paging message to the terminal device. The method further includes: When congestion occurs in the radio access network, the first access network device skips sending the second paging message, and sends paging failure indication information to the second access network device, to indicate that the paging fails.

In this embodiment of this application, the first access network device may determine, based on a congestion status of the radio access network, whether to send the second paging message, thereby improving the communication efficiency.

Optionally, the first access network device may determine a priority of the first paging message based on the first information. For example, different network slices correspond to different priorities. The first access network device may determine, based on the first information, a priority of a network slice supported by the terminal device, or a priority of a network slice triggering the first information, and determine the priority of the first paging message based on the priority of the network slice. When the first access network device receives a plurality of paging messages, the first access network device may preferentially send a paging message with a higher priority or preferentially allocate a resource to a paging message with a higher priority based on priorities corresponding to the paging messages.

In this embodiment of this application, the first access network device may determine the priority of the first paging message based on the first information, and perform paging based on the priority of the first paging message, thereby improving the communication efficiency.

In some examples, the access network device has a CU-DU split architecture. In this case, for the terminal device in the idle state, when a CU receives the first paging message sent by the core network device, the CU sends the second paging message to a DU. Similarly, after receiving the second paging message sent by the CU, the DU sends a third paging message to the terminal device. The first paging message may carry the first information. Further, the second paging message and the third paging message may also carry the first information. The CU and the DU may communicate with or page the terminal device based on the first information. This is similar to the foregoing content, and details are not described herein again.

For the terminal device in the inactive state, when receiving downlink data sent by a source access network device, the CU may trigger paging. The CU sends a paging message to the DU. The paging message may also carry the first information.

Figure 12:
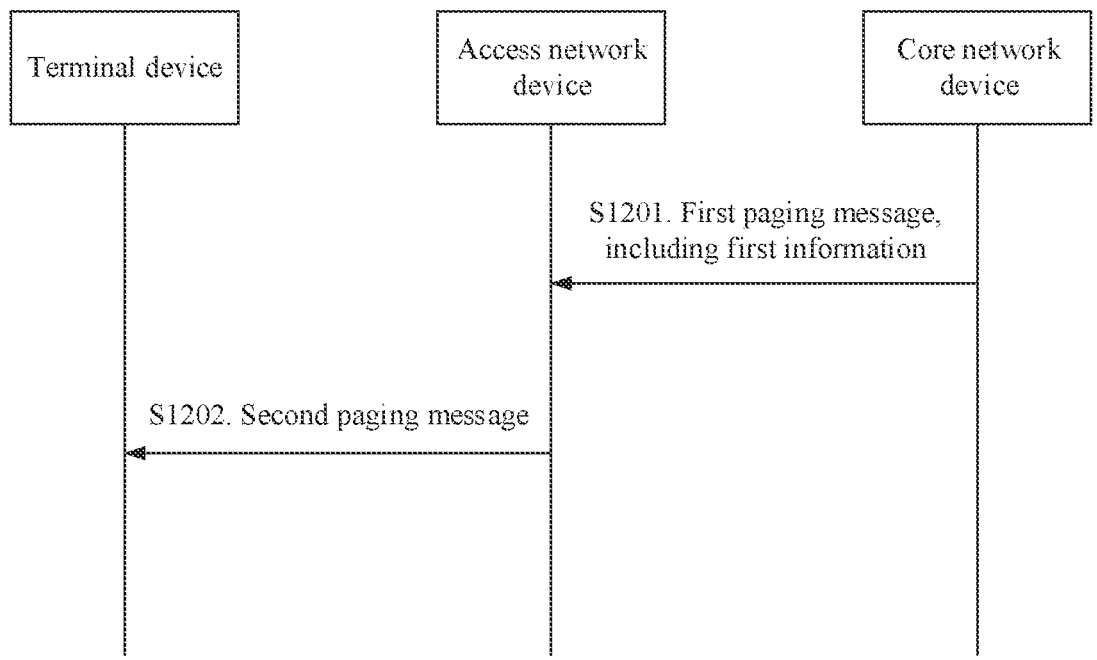
FIG. 12 is a diagram of a specific example of a paging method according to another embodiment of this application.

FIG. 12 is a diagram of a specific example of a paging method according to an embodiment of this application. A terminal device in FIG. 12 is in an idle state. That is, a core network device triggers paging. When finding that there is downlink data corresponding to the terminal device, the core network device sends a paging message to an access network device. The method in FIG. 12 includes the following steps.

S1201. The core network device sends a first paging message to the access network device. Correspondingly, the access network device receives the first paging message from the core network device. The first paging message includes first information.

The first paging message may be N2 interface signaling. The first information may carry at least one of the following messages: one or more pieces of S-NSSAI(s), indicating specific S-NSSAI triggering the paging message; S-NSSAI supported by the terminal device; a QF/5QI, indicating a specific QFI5QI (or specific QFIs/5QIs) triggering the paging message; a DNN or an index of a DNN, indicating a specific DNN in which a QFI/5QI triggers the paging message; single network slice selection assistance information (S-NSSAI) triggering the first paging message and/or network slice selection assistance information supported by the terminal device; and an ARP, indicating that the ARP triggers the paging message.

S1202. The access network device sends a second paging message to the terminal device. Correspondingly, the terminal device receives the second paging message.

Optionally, the second paging message may include the first information, or may not include the first information.

In some examples, the access network device may perform the following operation based on the received first paging message:

If congestion occurs in a radio access network, the access network device skips sending the second paging message, and feeds back a failure message to the core network device.

Alternatively, the access network device includes the first information in the second paging message, and broadcasts the second paging message to the terminal device. After receiving the first information, the terminal device may be indicated, based on the first information, to perform resource segmentation, where the resource may be, for example, random access channel (RACH) resource segmentation; or may indicate, in an RRC connection setup request, a connection setup cause value such as an identifier of a network slice, an identifier of the 5QI/QFI, an identifier of the ARP an identifier of the DNN, a mapping value of the identifier of the network slice, a mapping value of the identifier of the 5QI/QFI, a mapping value of the identifier of the ARP or a mapping value of the identifier of the DNN.

Figure 13:
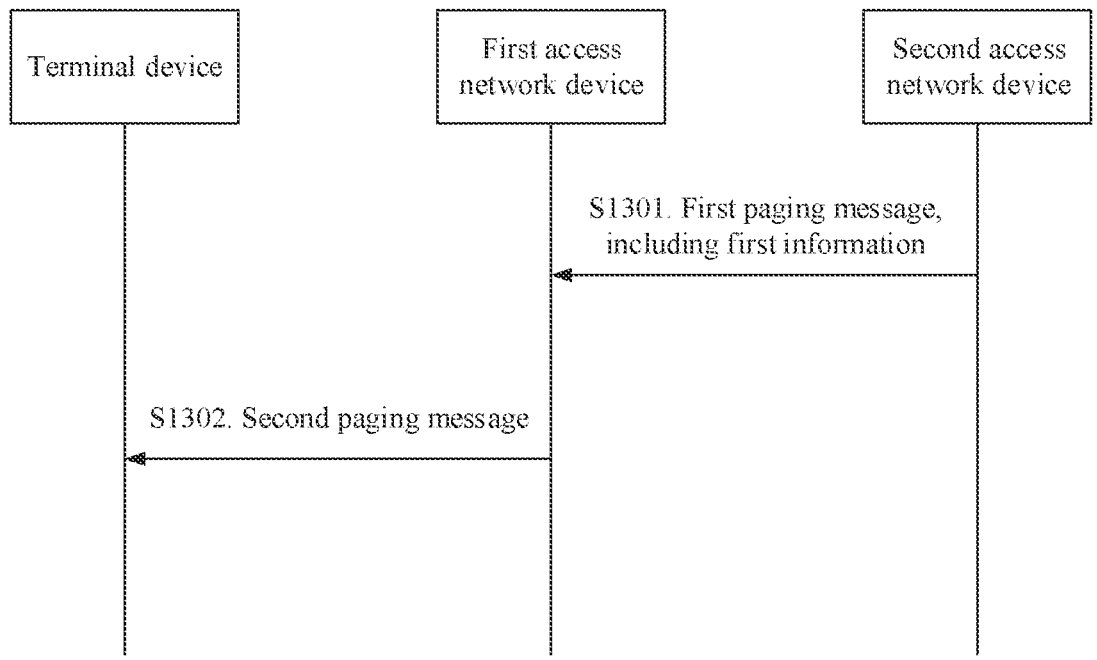
FIG. 13 is a diagram of a specific example of a paging method according to another embodiment of this application.

FIG. 13 is a diagram of a specific example of a paging method according to an embodiment of this application. A terminal device in FIG. 13 is in an inactive state. That is, an access network device on which the terminal device camped last time triggers paging. When finding that there is downlink data corresponding to the terminal device, a core network device sends the downlink data to a second access network device on which the terminal device camped last time. After receiving the downlink data, the second access network device sends a paging message to a first access network device on which the terminal device currently camps. As shown in FIG. 13, the paging method includes the following steps.

S1301. The second access network device sends a first paging message to the first access network device. Correspondingly, the first access network device receives the first paging message from the second access network device. The first paging message includes first information. The first access network device is an access network device on which the terminal device currently camps, and the second access network device is the access network device on which the terminal device camped last time.

The first paging message may be N2 interface signaling. The first information may carry at least one of the following messages: one or more pieces of S-NSSAI(s), indicating specific S-NSSAI triggering the paging message; S-NSSAI supported by the terminal device; a QF/5QI, indicating a specific QF/5QI (or specific QFIs/5QIs) triggering the paging message; a DNN or an index of a DNN, indicating a specific DNN in which a QFI/5QI triggers the paging message; single network slice selection assistance information (S-NSSAI) triggering the first paging message and/or network slice selection assistance information supported by the terminal device; and an ARP indicator, indicating that the ARP triggers the paging message.

S1302. The first access network device sends a second paging message to the terminal device. Correspondingly, the terminal device receives the second paging message.

Optionally, the second paging message may include the first information, or may not include the first information.

In some examples, the first access network device may perform the following operation based on the received first paging message.

If congestion occurs in a radio access network, the first access network device skips sending the second paging message, and feeds back a failure message to the second access network device.

Alternatively, the access network device includes the first information in the second paging message, and broadcasts the second paging message to the terminal device. After receiving the first information, the terminal device may be indicated, based on the first information, to perform resource segmentation, where the resource may be, for example, random access channel (RACH) resource segmentation; or may indicate, in an RRC connection setup request, a connection setup cause value such as an identifier of a network slice, an identifier of the 5Q/QFI, an identifier of the ARP, an identifier of the DNN, a mapping value of the identifier of the network slice, a mapping value of the identifier of the 5QI/QFI, a mapping value of the identifier of the ARP, or a mapping value of the identifier of the DNN.

Figure 14:
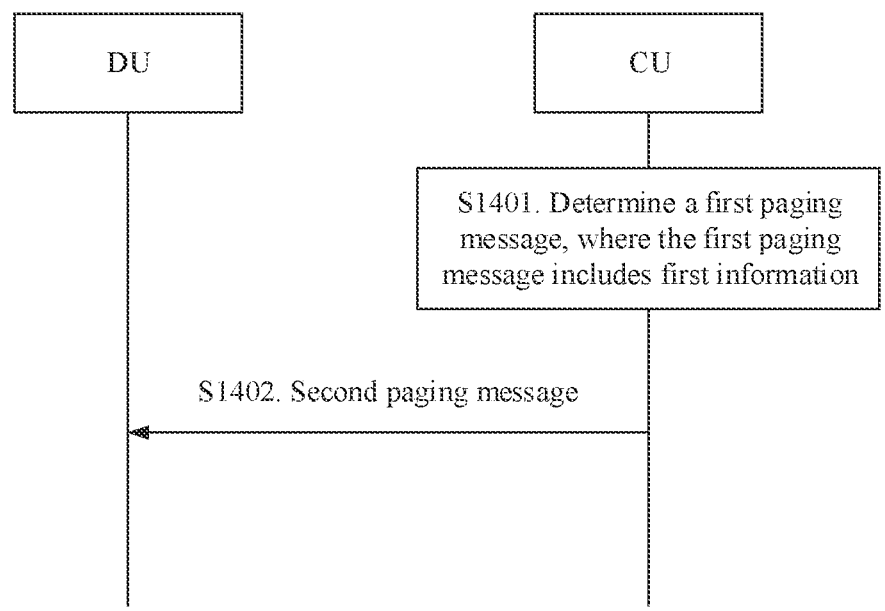
FIG. 14 is a diagram of a specific example of a paging method according to another embodiment of this application.

FIG. 14 is a diagram of a specific example of a paging method according to an embodiment of this application. An access network device in FIG. 14 has a CU-DU split architecture. The method in FIG. 14 includes the following steps.

S1401. A CU determines a first paging message. The first paging message includes first information.

Optionally, if a terminal device is in an idle state, the first paging message may be sent by a core network device. The first paging message may be N2 interface signaling.

Alternatively, if a terminal device is in an inactive state, the first paging message may be generated by the CU after the CU receives downlink data of the terminal device. In other words, it is assumed that the terminal device in the inactive state moves from a first DU to a second DU, where the first DU and the second DU are under control of a same CU. In this case, the CU generates the first paging message, and sends the first paging message to the second DU.

Optionally, the first information may carry at least one of the following messages: one or more pieces of S-NSSAI(s), indicating specific S-NSSAI triggering the paging message; S-NSSAI supported by the terminal device; a QFI5QI, indicating a specific QF5QI (or specific QFIs/5QIs) triggering the paging message; a DNN or an index of a DNN, indicating a specific DNN in which a QFI/5QI triggers the paging message; single network slice selection assistance information (S-NSSAI) triggering the first paging message and/or network slice selection assistance information supported by the terminal device; and an ARP, indicating that the ARP triggers the paging message.

S1402. The CU sends a second paging message to a DU. Correspondingly, the DU receives the second paging message from the CU.

Optionally, the second paging message may include the first information, or may not include the first information.

Optionally, after receiving the second paging message, the DU may further send a third paging message to the terminal device. The third paging message may also include the first information.

The foregoing describes the communication method and the paging method in the embodiments of this application with reference to FIG. 1 to FIG. 14. The following describes apparatuses in the embodiments of this application with reference to FIG. 15 to FIG. 23.

Figure 15:
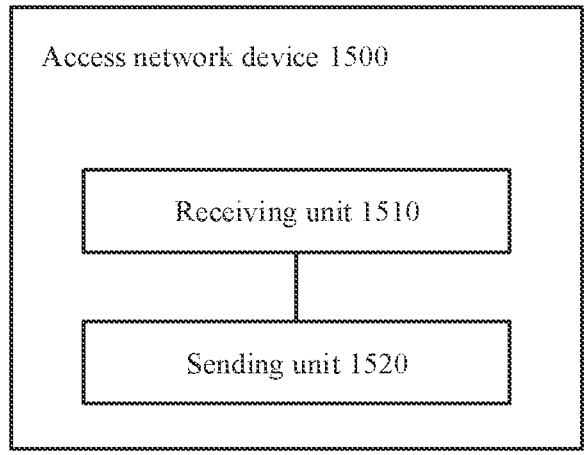
FIG. 15 is a schematic structural diagram of an access network device according to an embodiment of this application.

FIG. 15 is a schematic block diagram of an access network device 1500 according to an embodiment of this application. It should be understood that the access network device 1500 can perform the steps performed by the access network device in the methods in FIG. 1 to FIG. 14. To avoid repetition, details are not described herein again. The access network device may be, for example, the foregoing access network device, target access network device, first access network device, or second access network device. The access network device 1500 includes a receiving unit 1510 and a sending unit 1520.

The receiving unit 1510 is configured to receive a first paging message. The first paging message includes first information, and the first information includes at least one of the following: information about a network slice, a quality of service flow identifier (QoS flow ID, QFI), a 5th generation mobile communications technology quality of service identifier (5G QoS ID, 5QI) 5QI, a data network name (DNN), and an allocation and retention priority (ARP). The sending unit 1520 is configured to send a second paging message to a terminal device after the first paging message is received.

Alternatively, the access network device 1500 may be the foregoing first access network device. The sending unit 1520 is configured to send, to a second access network device, a request message for obtaining a context of a terminal device. The request message for obtaining the context of the terminal device is used to request the context of the terminal device. The first access network device is an access network device on which the terminal device currently camps, and the second access network device is an access network device on which the terminal device camped last time. The receiving unit 1510 is configured to receive, from the second access network device, a response message for obtaining the context of the terminal device. The response message for obtaining the context of the terminal device includes network slice selection assistance information supported by the terminal device, and the network slice selection assistance information is used to indicate a network slice supported by the terminal device.

Alternatively, the access network device 1500 may be the foregoing second access network device. The receiving unit 1510 is configured to receive, from a first access network device, a request message for obtaining a context of a terminal device. The request message for obtaining the context of the terminal device is used to request the context of the terminal device. The first access network device is an access network device on which the terminal device currently camps, and the second access network device is an access network device on which the terminal device camped last time. The sending unit 1520 is configured to send, to the first access network device, a response message for obtaining the context of the terminal device. The response message for obtaining the context of the terminal device includes network slice selection assistance information supported by the terminal device, and the network slice selection assistance information is used to indicate a network slice supported by the terminal device.

Alternatively, the receiving unit 1510 is configured to receive a third message from a terminal device. The third message includes a service request message, and the service request message is used to request to switch the terminal device from an idle state to a connected state. The third message further includes at least one of the following: network slice selection assistance information supported by the terminal device and single network slice selection assistance information. The sending unit 1520 is configured to send a fourth message to a core network device. The fourth message includes the service request message.

Figure 16:
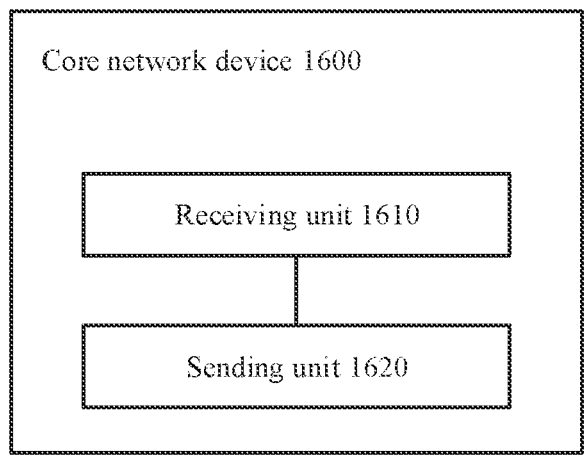
FIG. 16 is a schematic structural diagram of a core network device according to an embodiment of this application.

FIG. 16 is a schematic block diagram of a core network device 1600 according to an embodiment of this application. It should be understood that the core network device 1600 can perform the steps performed by the core network device in the methods in FIG. 1 to FIG. 14. To avoid repetition, details are not described herein again. The core network device 1600 includes a receiving unit 1610 and a sending unit 1620.

The receiving unit 1610 is configured to receive a path switch request message from a target access network device. The path switch request message is used to request to hand over a terminal device from a source access network device to the target access network device. The sending unit 1620 is configured to send a path switch request acknowledge message to the target access network device. The path switch request acknowledge message includes network slice selection assistance information supported by the terminal device, and the network slice selection assistance information supported by the terminal device is used to indicate a network slice supported by the terminal device.

Alternatively, the receiving unit 1610 is configured to receive a registration request message from a target access network device. The registration request message is used to request to update a registration area of a terminal device. The sending unit 1620 is configured to send a first message to the target access network device. The first message includes a registration accept message and network slice selection assistance information supported by the terminal device, and the registration accept message is used to respond to the registration request message.

Figure 17:
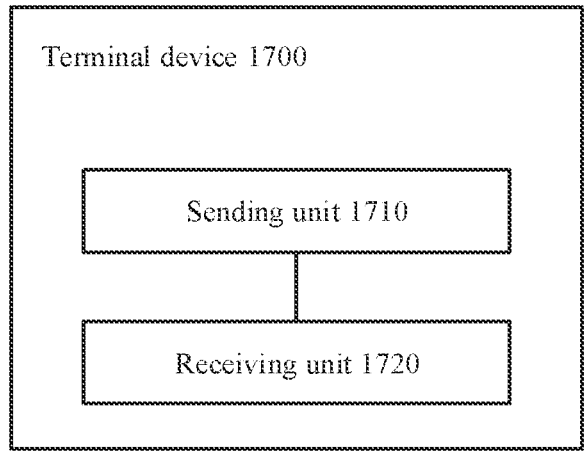
FIG. 17 is a schematic structural diagram of a terminal device according to an embodiment of this application.

FIG. 17 is a schematic block diagram of a terminal device 1700 according to an embodiment of this application. It should be understood that the terminal device 1700 can perform the steps performed by the terminal device in the methods in FIG. 1 to FIG. 14. To avoid repetition, details are not described herein again. The terminal device 1700 includes a sending unit 1710 and a receiving unit 1720.

The sending unit 1710 is configured to send a registration request message to an access network device. The registration request message is used to request to update a registration area of the terminal device. The receiving unit 1720 is configured to receive a second message from the access network device. The second message includes a registration accept message and network slice selection assistance information supported by the terminal device, and the registration accept message is used to respond to the registration request message.

Figure 18:
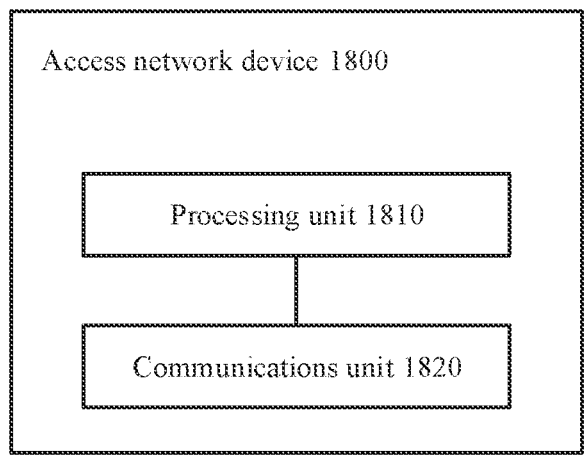
FIG. 18 is a schematic structural diagram of an access network device according to another embodiment of this application.

FIG. 18 is a schematic block diagram of an access network device 1800 according to another embodiment of this application. It should be understood that the access network device 1800 can perform the steps performed by the access network device in the methods in FIG. 1 to FIG. 14. To avoid repetition, details are not described herein again. The access network device may be, for example, the foregoing source access network device or second access network device. The access network device 1800 includes a processing unit 1810 and a communications unit 1820.

The access network device 1800 may be the target access network device. The communications unit 1820 is configured to receive a handover request message sent by a source access network device. The handover request message is used to request to hand over a terminal device from the source access network device to the target access network device. The processing unit 1810 is configured to obtain network slice selection assistance information supported by the terminal device. The network slice selection assistance information supported by the terminal device is used to indicate a network slice supported by the terminal device.

The access network device 1800 may be the source access network device. The processing unit 1810 is configured to generate a handover request message. The handover request message is used to request to hand over a terminal device from the source access network device to a target access network device, and includes network slice selection assistance information supported by the terminal device, and the network slice selection assistance information supported by the terminal device is used to indicate a network slice supported by the terminal device. The communications unit 1820 is configured to send the handover request message to the target access network device.

Alternatively, the access network device 1800 may be the second access network device. The processing unit 1810 is configured to generate a first paging message. The first paging message corresponds to a terminal device, and includes first information, and the first information includes at least one of the following: information about a network slice, a QFI, a 5QI, an ARP, and a DNN. The communications unit 1820 is configured to send the first paging message to a first access network device. The first access network device is an access network device on which the terminal device currently camps, and the second access network device is an access network device on which the terminal device camped last time.

Figure 19:
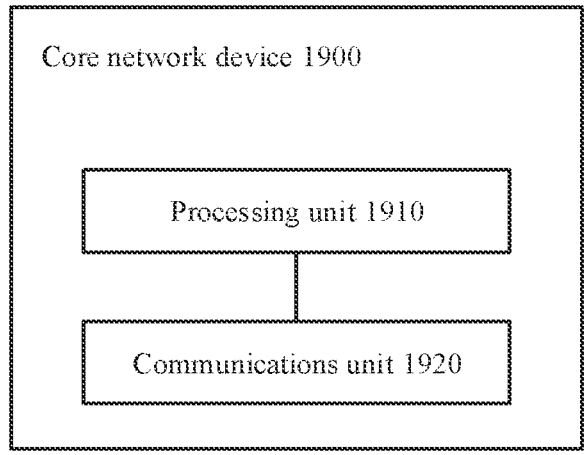
FIG. 19 is a schematic structural diagram of a core network device according to another embodiment of this application.

FIG. 19 is a schematic block diagram of a core network device 1900 according to another embodiment of this application. It should be understood that the core network device 1900 can perform the steps performed by the core network device in the methods in FIG. 1 to FIG. 14. To avoid repetition, details are not described herein again. The core network device 1900 includes a processing unit 1910 and a communications unit 1920.

The processing unit 1910 is configured to generate a first paging message. The first paging message includes first information, and the first information includes at least one of the following: information about a network slice, a QFI, a 5QI, an ARP, and a DNN. The communications unit 1920 is configured to send the first paging message to an access network device.

Figure 20:
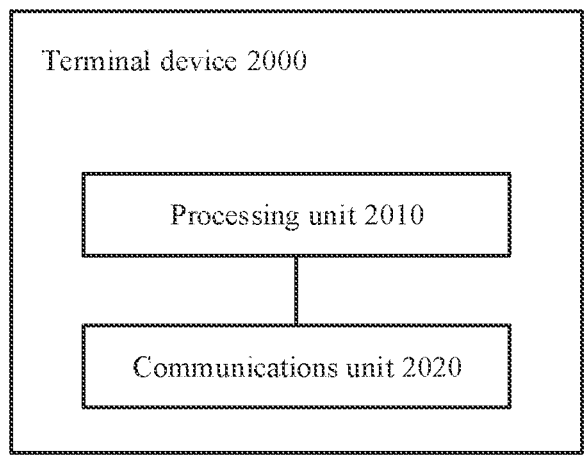
FIG. 20 is a schematic structural diagram of a terminal device according to another embodiment of this application.

FIG. 20 is a schematic block diagram of a terminal device 2000 according to an embodiment of this application. It should be understood that the terminal device 2000 can perform the steps performed by the terminal device in the methods in FIG. 1 to FIG. 14. To avoid repetition, details are not described herein again. The terminal device 2000 includes a processing unit 2010 and a communications unit 2020.

The processing unit 2010 is configured to generate a third message. The third message includes a service request message, and the service request message is used to request to switch the terminal device from an idle state to a connected state. The third message further includes at least one of the following: network slice selection assistance information supported by the terminal device and single network slice selection assistance information. The communications unit 2020 is configured to send the third message to an access network device.

Figure 21:
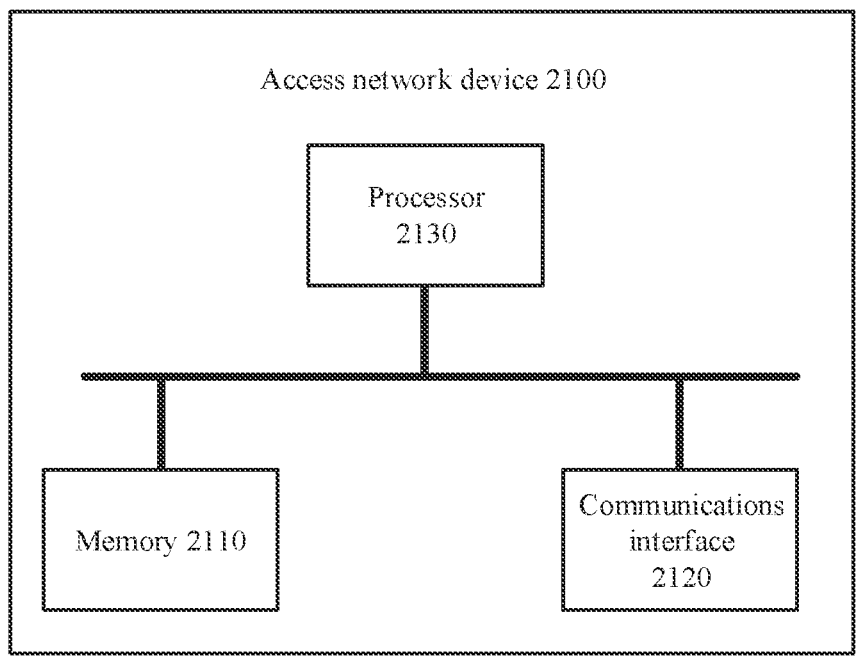
FIG. 21 is a schematic structural diagram of an access network device according to another embodiment of this application.

FIG. 21 is a schematic block diagram of an access network device 2100 according to an embodiment of this application. It should be understood that the access network device 2100 can perform the steps performed by the access network device in the methods in FIG. 1 to FIG. 14. To avoid repetition, details are not described herein again. The access network device may be, for example, the foregoing access network device, target access network device, source access network device, first access network device, or second access network device. The access network device 2100 includes:

a memory 2110, configured to store a program;
a communications interface 2120, configured to communicate with another device; and
a processor 2130, configured to execute the program in the memory 2110; and when the program is executed:

The access network device 2100 may be the target access network device. The processor 2130 is configured to receive, through the communications interface 2120, a handover request message sent by a source access network device. The handover request message is used to request to hand over a terminal device from the source access network device to the target access network device. In addition, the processor 2130 is configured to obtain, through the communications interface 2120, network slice selection assistance information supported by the terminal device. The network slice selection assistance information supported by the terminal device is used to indicate a network slice supported by the terminal device.

Alternatively, the processor 2130 is configured to receive a first paging message through the communications interface 2120. The first paging message includes first information, and the first information includes at least one of the following: information about a network slice, a quality of service flow identifier (QoS flow ID, QFI), a 5th generation mobile communications technology quality of service identifier (5G QoS ID, 5QI) 5QI, and a data network name (DNN). In addition, the processor 2130 is configured to send a second paging message to a terminal device through the communications interface 2120 after receiving the first paging message.

Alternatively, the access network device 2100 may be the foregoing first access network device. The processor 2130 is configured to send, to a second access network device through the communications interface 2120, a request message for obtaining a context of a terminal device. The request message for obtaining the context of the terminal device is used to request the context of the terminal device. The first access network device is an access network device on which the terminal device currently camps, and the second access network device is an access network device on which the terminal device camped last time. In addition, the processor 2130 is configured to receive, from the second access network device through the communications interface 2120, a response message for obtaining the context of the terminal device. The response message for obtaining the context of the terminal device includes network slice selection assistance information supported by the terminal device, and the network slice selection assistance information is used to indicate a network slice supported by the terminal device.

Alternatively, the access network device 2100 may be the foregoing second access network device. The processor 2130 is configured to receive, from a first access network device through the communications interface 2120, a request message for obtaining a context of a terminal device. The request message for obtaining the context of the terminal device is used to request the context of the terminal device. The first access network device is an access network device on which the terminal device currently camps, and the second access network device is an access network device on which the terminal device camped last time. In addition, the processor 2130 is configured to send, to the first access network device through the communications interface 2120, a response message for obtaining the context of the terminal device. The response message for obtaining the context of the terminal device includes network slice selection assistance information supported by the terminal device, and the network slice selection assistance information is used to indicate a network slice supported by the terminal device.

Alternatively, the processor 2130 is configured to receive a third message from a terminal device through the communications interface 2120. The third message includes a service request message, and the service request message is used to request to switch the terminal device from an idle state to a connected state. The third message further includes at least one of the following: network slice selection assistance information supported by the terminal device and single network slice selection assistance information. In addition, the processor 2130 is configured to send a fourth message to a core network device through the communications interface 2120. The fourth message includes the service request message.

Alternatively, the access network device 2100 may be the source access network device. The processor 2130 is configured to generate a handover request message. The handover request message is used to request to hand over a terminal device from the source access network device to a target access network device, and includes network slice selection assistance information supported by the terminal device, and the network slice selection assistance information supported by the terminal device is used to indicate a network slice supported by the terminal device. In addition, the processor 2130 is configured to send the handover request message to the target access network device through the communications interface 2120.

Alternatively, the access network device 2100 may be the second access network device. The processor 2130 is configured to generate a first paging message. The first paging message corresponds to a terminal device, and includes first information, and the first information includes at least one of the following: information about a network slice, a QFI, a 5QI, an ARP, and a DNN. In addition, the processor 2130 is configured to send the first paging message to a first access network device through the communications interface 2120. The first access network device is an access network device on which the terminal device currently camps, and the second access network device is an access network device on which the terminal device camped last time.

It should be understood that the access network device shown in FIG. 21 may be a chip, a circuit, or another type of access network device, for example, a chip or a circuit that may be disposed in an access network device. Further, the communications interface 2120 may alternatively be interchanged with a transceiver. The transceiver includes a receiver and a transmitter. Still further, the access network device 2100 may further include a bus system.

The processor 2130, the memory 2110, the receiver, and the transmitter are connected to each other through the bus system. The processor 2130 is configured to execute an instruction stored in the memory 2110, to control the receiver to receive a signal and control the transmitter to send a signal, thereby completing the steps performed by the network device in the communication methods in this application. The receiver and the transmitter may be a same physical entity or different physical entities. When being a same physical entity, the receiver and the transmitter may be collectively referred to as a transceiver. The memory 2110 may be integrated into the processor 2130, or may be disposed separately from the processor 2130.

In an implementation, functions of the receiver and the transmitter may be considered to be implemented through a transceiver circuit or a dedicated transceiver chip. The processor 2130 may be considered to be implemented through a dedicated processing chip, a processing circuit, a processor, or a general-purpose chip.

In another implementation, the terminal device provided in this embodiment of this application may be considered to be implemented through a general-purpose computer. To be specific, program code for implementing functions of the processor 2130, the receiver, and the transmitter are stored in the memory, and a general-purpose processor implements the functions of the processor 2130, the receiver, and the transmitter by executing the code in the memory.

Figure 22:
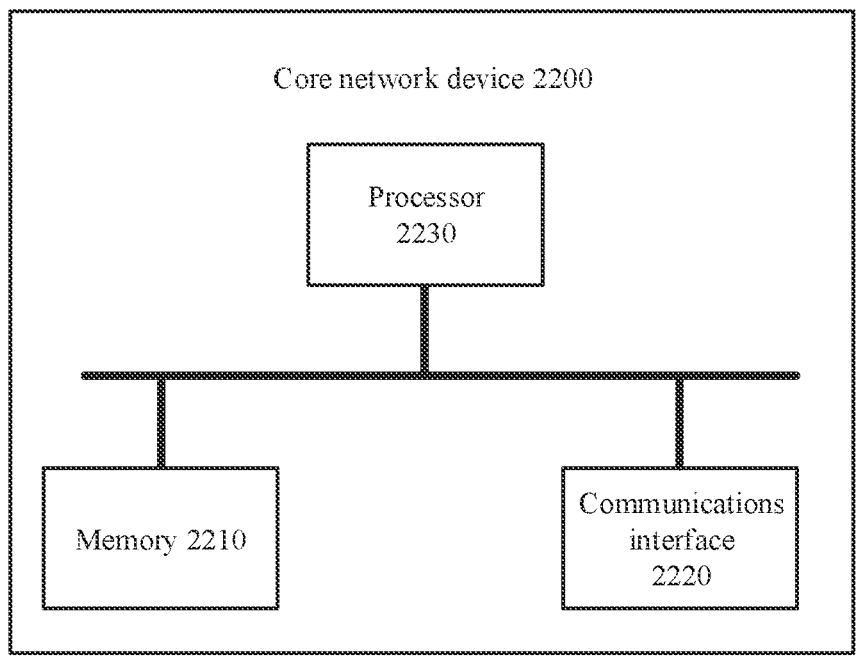
FIG. 22 is a schematic structural diagram of a core network device according to another embodiment of this application.

FIG. 22 is a schematic block diagram of a core network device 2200 according to an embodiment of this application. It should be understood that the core network device 2200 can perform the steps performed by the core network device in the methods in FIG. 1 to FIG. 14. To avoid repetition, details are not described herein again. The core network device 2200 includes:

a memory 2210, configured to store a program;

a communications interface 2220, configured to communicate with another device; and a processor 2230, configured to execute the program in the memory 2210: and when the program is executed:

The processor 2230 is configured to receive a path switch request message from a target access network device through the communications interface 2220. The path switch request message is used to request to hand over a terminal device from a source access network device to the target access network device. In addition, the processor 2230 is configured to send a path switch request acknowledge message to the target access network device through the communications interface 2220. The path switch request acknowledge message includes network slice selection assistance information supported by the terminal device, and the network slice selection assistance information supported by the terminal device is used to indicate a network slice supported by the terminal device.

Alternatively, the processor 2230 is configured to receive a registration request message from a target access network device through the communications interface 2220. The registration request message is used to request to update a registration area of a terminal device. In addition, the processor 2230 is configured to send a first message to the target access network device through the communications interface 2220. The first message includes a registration accept message and network slice selection assistance information supported by the terminal device, and the registration accept message is used to respond to the registration request message.

Alternatively, the processor 2230 is configured to generate a first paging message. The first paging message includes first information, and the first information includes at least one of the following: information about a network slice, a QFI, a 5QI, an ARP, and a DNN. In addition, the processor 2230 is configured to send the first paging message to an access network device through the communications interface 2220.

It should be understood that the core network device shown in FIG. 22 may be a chip, a circuit, or another type of core network device, for example, a chip or a circuit that may be disposed in a core network device. Further, the communications interface 2220 may alternatively be interchanged with a transceiver. The transceiver includes a receiver and a transmitter. Still further, the terminal device 2200 may further include a bus system.

The processor 2230, the memory 2210, the receiver, and the transmitter are connected to each other through the bus system. The processor 2230 is configured to execute an instruction stored in the memory 2210, to control the receiver to receive a signal and control the transmitter to send a signal, thereby completing the steps performed by the network device in the communication methods in this application. The receiver and the transmitter may be a same physical entity or different physical entities. When being a same physical entity, the receiver and the transmitter may be collectively referred to as a transceiver. The memory 2210 may be integrated into the processor 2230, or may be disposed separately from the processor 2230.

In an implementation, functions of the receiver and the transmitter may be considered to be implemented through a transceiver circuit or a dedicated transceiver chip. The processor 2230 may be considered to be implemented through a dedicated processing chip, a processing circuit, a processor, or a general-purpose chip.

In another implementation, the core network device provided in this embodiment of this application may be considered to be implemented through a general-purpose computer. To be specific, program code for implementing functions of the processor 2230, the receiver, and the transmitter are stored in the memory, and a general-purpose processor implements the functions of the processor 2230, the receiver, and the transmitter by executing the code in the memory.

Figure 23:
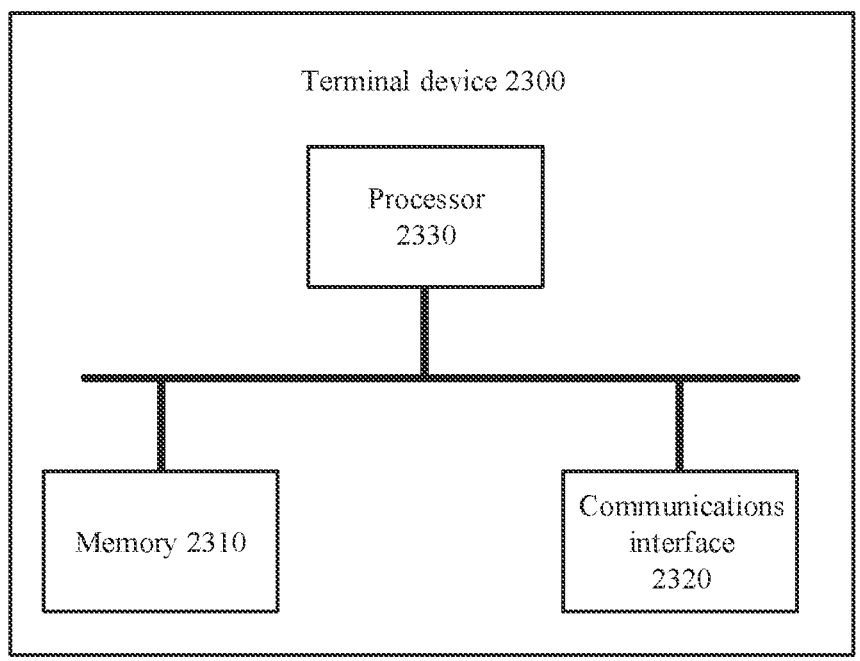
FIG. 23 is a schematic structural diagram of a terminal device according to another embodiment of this application.

FIG. 23 is a schematic block diagram of a terminal device 2300 according to an embodiment of this application. It should be understood that the terminal device 2300 can perform the steps performed by the first terminal device in the methods in FIG. 1 to FIG. 14. To avoid repetition, details are not described herein again. The terminal device 2300 includes:

a memory 2310, configured to store a program;

a communications interface 2320, configured to communicate with another device; and a processor 2330, configured to execute the program in the memory 2310; and when the program is executed:

The processor 2330 is configured to send a registration request message to an access network device through the communications interface 2320. The registration request message is used to request to update a registration area of the terminal device. In addition, the processor 2330 is configured to receive a second message from the access network device through the communications interface 2320. The second message includes a registration accept message and network slice selection assistance information supported by the terminal device, and the registration accept message is used to respond to the registration request message.

Alternatively, the processor 2330 is configured to generate a third message. The third message includes a service request message, and the service request message is used to request to switch the terminal device from an idle state to a connected state. The third message further includes at least one of the following: network slice selection assistance information supported by the terminal device and single network slice selection assistance information. In addition, the processor 2330 is configured to send the third message to an access network device through the communications interface 2320.

It should be understood that the terminal device shown in FIG. 23 may be a chip, a circuit, or another type of terminal device, for example, a chip or a circuit that may be disposed in a terminal device. Further, the communications interface 2320 may alternatively be interchanged with a transceiver. The transceiver includes a receiver and a transmitter. Still further, the terminal device 2300 may further include a bus system.

The processor 2330, the memory 2310, the receiver, and the transmitter are connected to each other through the bus system. The processor 2330 is configured to execute an instruction stored in the memory 2310, to control the receiver to receive a signal and control the transmitter to send a signal, thereby completing the steps performed by the network device in the communication methods in this application. The receiver and the transmitter may be a same physical entity or different physical entities. When being a same physical entity, the receiver and the transmitter may be collectively referred to as a transceiver. The memory 2310 may be integrated into the processor 2330, or may be disposed separately from the processor 2330.

In an implementation, functions of the receiver and the transmitter may be considered to be implemented through a transceiver circuit or a dedicated transceiver chip. The processor 2330 may be considered to be implemented through a dedicated processing chip, a processing circuit, a processor, or a general-purpose chip.

In another implementation, the terminal device provided in this embodiment of this application may be considered to be implemented through a general-purpose computer. To be specific, program code for implementing functions of the processor 2330, the receiver, and the transmitter are stored in the memory, and a general-purpose processor implements the functions of the processor 2330, the receiver, and the transmitter by executing the code in the memory.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a target access network device and from a source access network device, a handover request message for requesting to hand over a terminal device from the source access network device to the target access network device;
sending, by the target access network device to a core network device, a registration request message for requesting to update a registration area of the terminal device, wherein the registration request message is a non-access stratum (NAS) message, and wherein the registration request message is sent by the terminal device to the target access network device in response to determining that the source access network device and the target access network device belong to different registration areas;
receiving, by the target access network device from the core network device, a first message that comprises a registration accept message and network slice selection assistance information (NSSAI), wherein the NSSAI indicates a network slice supported by the terminal device;
parsing, by the target access network device, the first message to obtain the NSSAI without parsing the registration accept message; and
sending, by the target access network device to the terminal device, a second message that comprises the registration accept message and the NSSAI.

2. The method according to claim 1, wherein the method further comprises:
sending, by the target access network device and to a core network device, a path switch request message for requesting to hand over the terminal device from the source access network device to the target access network device; and
receiving, by the target access network device and from the core network device, a path switch request acknowledge message that comprises the NSSAI.

3. The method according to claim 1, wherein the method further comprises:
before sending the registration request message, receiving, by the target access network device, the registration request message from the terminal device.

4. The method according to claim 1, wherein the handover request message comprises the NSSAI.

5. The method according to claim 4, wherein the handover request message further comprises registration area information of the terminal device, and the registration area information indicates a tracking area corresponding to the terminal device.

6. The method according to claim 1, wherein the NSSAI is obtained by the target access network device from a core network device.

7. The method according to claim 6, wherein the NSSAI is updated by the core network device.

8. The method according to claim 1, wherein the handover request message comprises a list of sessions to be established by the target access network device for the terminal device and NSSAI corresponding to each of the list of sessions, and wherein the list of sessions comprises sessions currently performed by the terminal device.

9. A communication method, comprising:
sending, by a terminal device and to a target access network device, a registration request message for requesting the target access network device to update a registration area of the terminal device, wherein the registration request message is a non-access stratum (NAS) message, and wherein the registration request message is sent by the terminal device to the target access network device in response to determining that a source access network device and the target access network device for performing handover of the terminal device belong to different registration areas; and
receiving, by the terminal device and from the target access network device, a second message that comprises a registration accept message for responding to the registration request message and network slice selection assistance information (NSSAI) supported by the terminal device, wherein the NSSAI is obtained by the target access network device by parsing a first message from a core network device without parsing the registration accept message, and wherein the first message comprises the NSSAI and the registration accept message.

10. An access network device comprising:
at least one processor; and
one or more memories coupled to the at least one processor and storing programming instructions for execution by the at least one processor, the programming instructions instruct the at least one processor to perform operations comprising:
receiving a handover request message sent by a source access network device for requesting to hand over a terminal device from the source access network device to the access network device;
sending, by the access network device to a core network device, a registration request message for requesting to update a registration area of the terminal device, wherein the registration request message is a non-access stratum (NAS) message, and wherein the registration request message is sent by the terminal device to the access network device in response to determining that the source access network device and the access network device belong to different registration areas;
receiving, from the core network device, a first message that comprises a registration accept message and network slice selection assistance information (NSSAI), wherein the NSSAI indicates a network slice supported by the terminal device;
parsing, by the access network device, the first message to obtain the NSSAI without parsing the registration accept message; and
sending, to the terminal device, a second message that comprises the registration accept message and the NSSAI.

11. The device according to claim 10, wherein the operations further comprising:
sending a path switch request message to a core network device for requesting to hand over the terminal device from the source access network device to the access network device; and
receiving a path switch request acknowledge message from the core network device that comprises the NSSAI.

12. The device according to claim 10, wherein the operations further comprising: before sending the registration request message, receiving the registration request message from the terminal device.

13. The device according to claim 10, wherein the handover request message comprises the NSSAI.

14. The device according to claim 13, wherein the handover request message further comprises registration area information of the terminal device, and the registration area information indicates a tracking area corresponding to the terminal device.

15. The device according to claim 10, wherein the operations further comprising: obtaining, from a core network device, the NSSAI is obtained by the access network device from a core network device.

16. The device according to claim 15, wherein the NSSAI is updated by the core network device.

17. The device according to claim 10, wherein the handover request message comprises a list of sessions to be established by the access network device for the terminal device and NSSAI corresponding to each of the list of sessions, and wherein the list of sessions comprises sessions currently performed by the terminal device.

* * * * *